United States Patent
Wang et al.

(10) Patent No.: US 6,229,782 B1
(45) Date of Patent: May 8, 2001

(54) HIGH NUMERICAL APERTURE OPTICAL FOCUSING DEVICE FOR USE IN DATA STORAGE SYSTEMS

(75) Inventors: Yugang Wang, Milpitas; Chuan He, Fremont; Hong Chen, San Jose; Joseph J. Miceli, Saratoga; Charles C. Cheng, Cupertino; Ross W. Stovall, Fremont, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/179,278

(22) Filed: Oct. 26, 1998

Related U.S. Application Data

(63) Continuation-in-part of application No. 09/111,098, filed on Jul. 6, 1998, now Pat. No. 6,130,779.
(60) Provisional application No. 60/091,788, filed on Jul. 6, 1998, provisional application No. 60/091,784, filed on Jul. 6, 1998, and provisional application No. 60/091,787, filed on Jul. 6, 1998.

(51) Int. Cl.[7] .................................................... G11B 7/00
(52) U.S. Cl. .................................. 369/112.08; 369/112.29
(58) Field of Search ...................................... 369/103, 109, 369/112, 118, 110, 13, 44.23, 44.14, 44.19; 359/559, 562, 162, 566, 793, 717, 719; 216/24, 26; 360/114

(56) References Cited

U.S. PATENT DOCUMENTS

| | | | |
|---|---|---|---|
| 4,415,238 | * 11/1983 | Braat et al. ........................... | 359/719 |
| 5,042,928 | 8/1991 | Richards .............................. | 359/728 |
| 5,125,750 | 6/1992 | Corle et al. .......................... | 350/819 |
| 5,497,359 | 3/1996 | Mamin et al. ........................ | 369/44 |
| 5,689,480 | 11/1997 | Kino ..................................... | 369/14 |
| 5,843,321 | * 12/1998 | Kamihara et al. ...................... | 216/26 |
| 5,859,814 | * 1/1999 | Kino et al. ........................... | 369/112 |
| 5,864,430 | * 1/1999 | Dickey et al. ........................ | 359/559 |
| 5,881,042 | * 3/1999 | Knight ................................... | 369/112 |
| 5,903,525 | * 5/1999 | McDanniel et al. ................... | 369/112 |
| 5,946,281 | * 8/1999 | Ito et al. ............................... | 369/112 |
| 5,978,139 | * 11/1999 | Hatakoshi et al. .................... | 369/112 |
| 6,055,220 | * 4/2000 | Mamin et al. ........................ | 369/112 |
| 6,097,551 | * 8/2000 | Kreitzer ................................ | 359/793 |

OTHER PUBLICATIONS

Lee, C.W., et al., "Feasibility Study on Near Field Optical Memory Using A Catadioptric Optical System", Optical Data Storage, Technical Digest Series, vol. 8, pp. 137–139, May 10–13, 1998.

Mansipur, M. et al. "Parallel Processing", 42 Optics and Photonics News, pp. 42–45, Jun. 1998.

* cited by examiner

Primary Examiner—Hoa T. Nguyen
Assistant Examiner—Kim-Kwok Chu
(74) Attorney, Agent, or Firm—Samuel A. Kassatly

(57) ABSTRACT

An optical focusing device for focusing an incident optical beam onto a focal plane, as a focal spot. The optical focusing device includes an incident central refractive facet upon which an optical beam impinges, and a high-index glass body through which the incident optical beam passes toward a bottom reflective surface. The bottom reflective surface reflects the optical beam through the body, toward a peripheral reflector. The peripheral reflector focuses the optical beam toward a focal plane on which the focal spot is formed. The focal plane is defined within a pedestal that forms part of the optical focusing device, and that extends from the bottom reflective surface. The central facet is conically shaped for refracting the incident optical beam away from the pedestal, onto the bottom reflective surface. The peripheral reflector surrounds the central facet and can have various appropriate shapes, such as an aspherical shape or a tilted parabolic shape, which compensates for the conical factor and aberrations introduced by the central facet. The top surface includes the central facet and the peripheral facet, and can be made substantially flat using diffractive optical elements or Fresnel optics. The focal spot of the optical rays can be optimized using sequential quadratic program and a set of optimized coefficients.

27 Claims, 30 Drawing Sheets

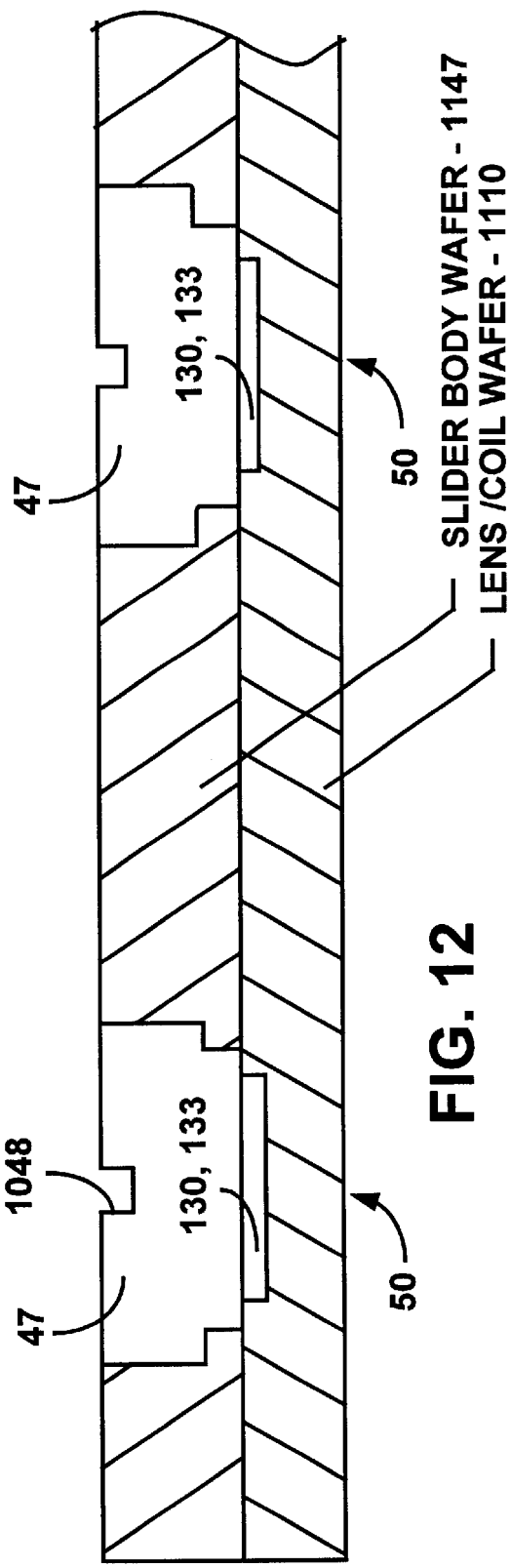
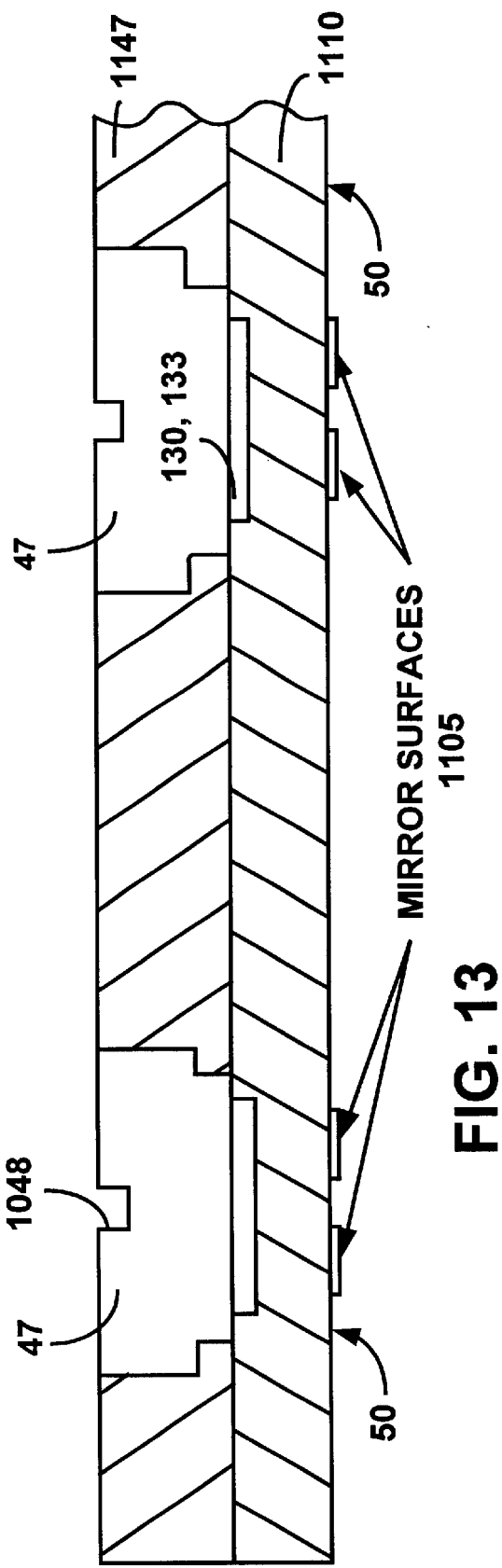

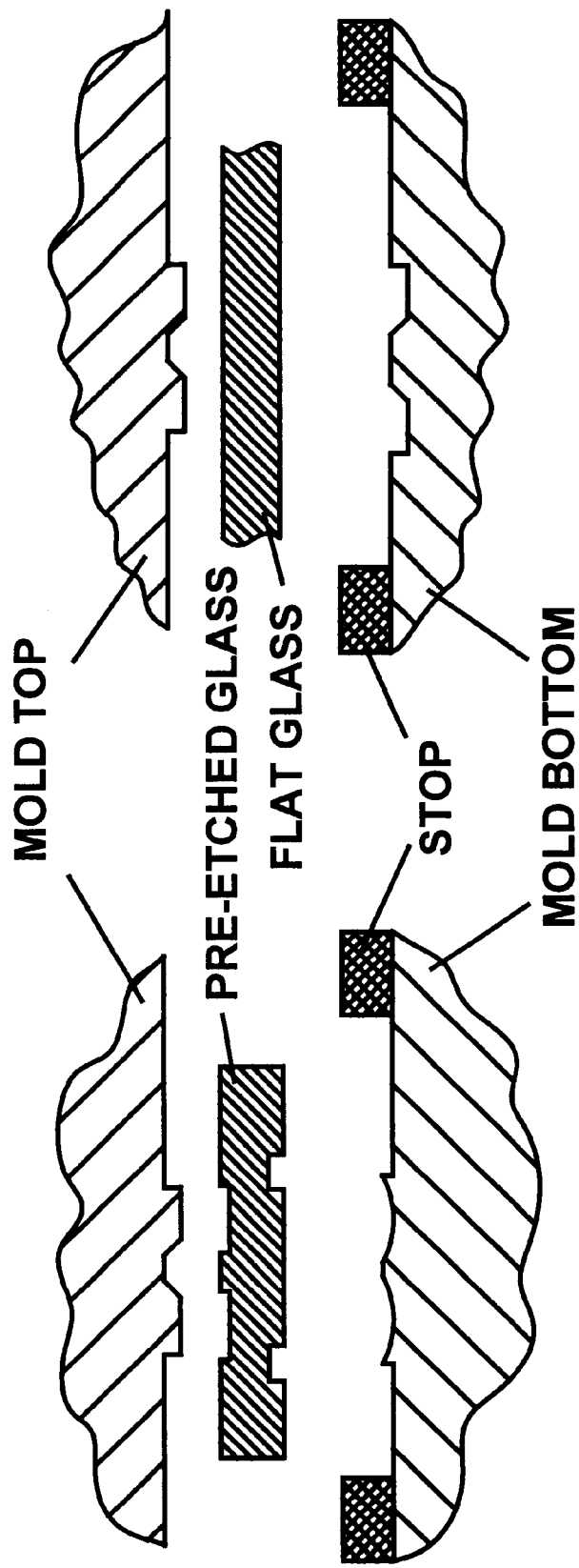

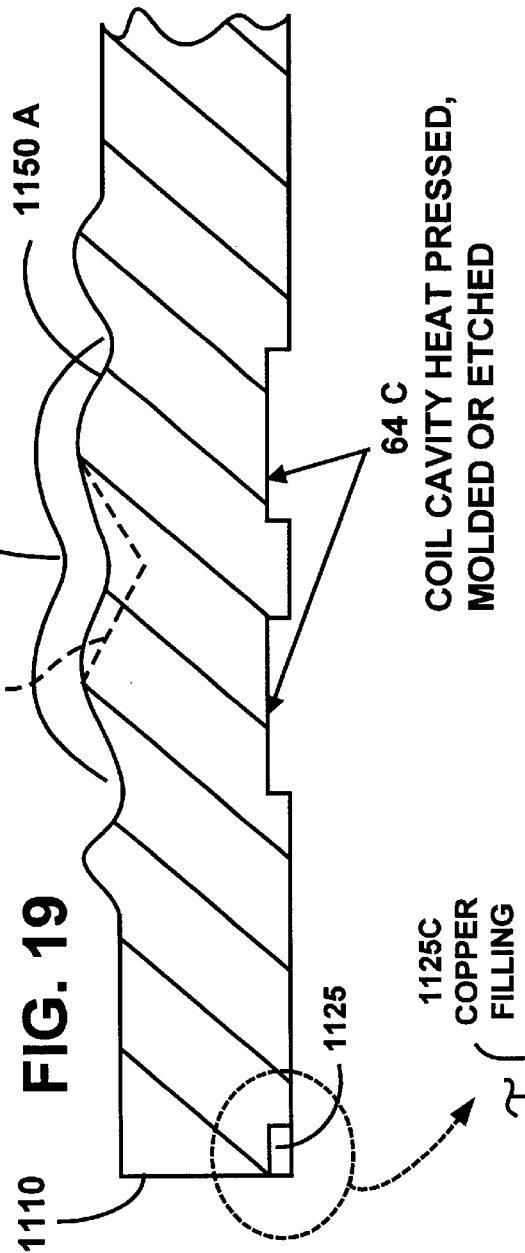

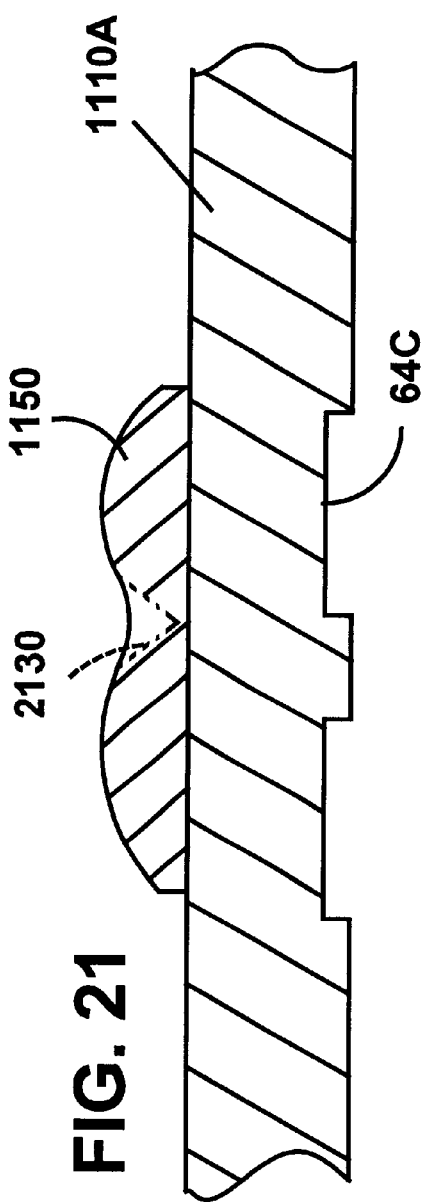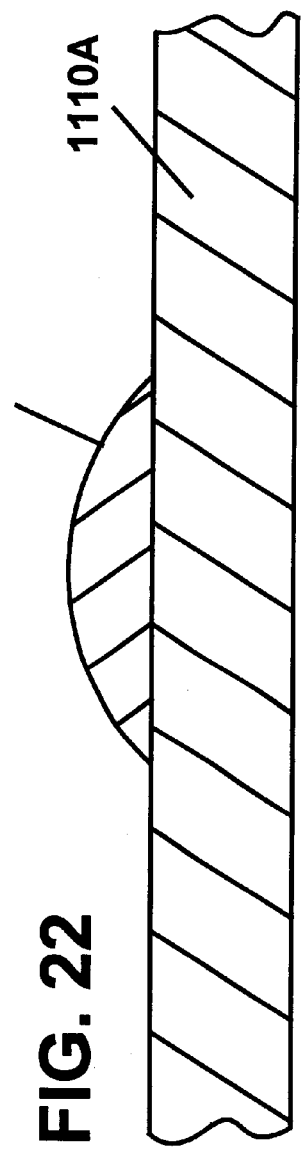

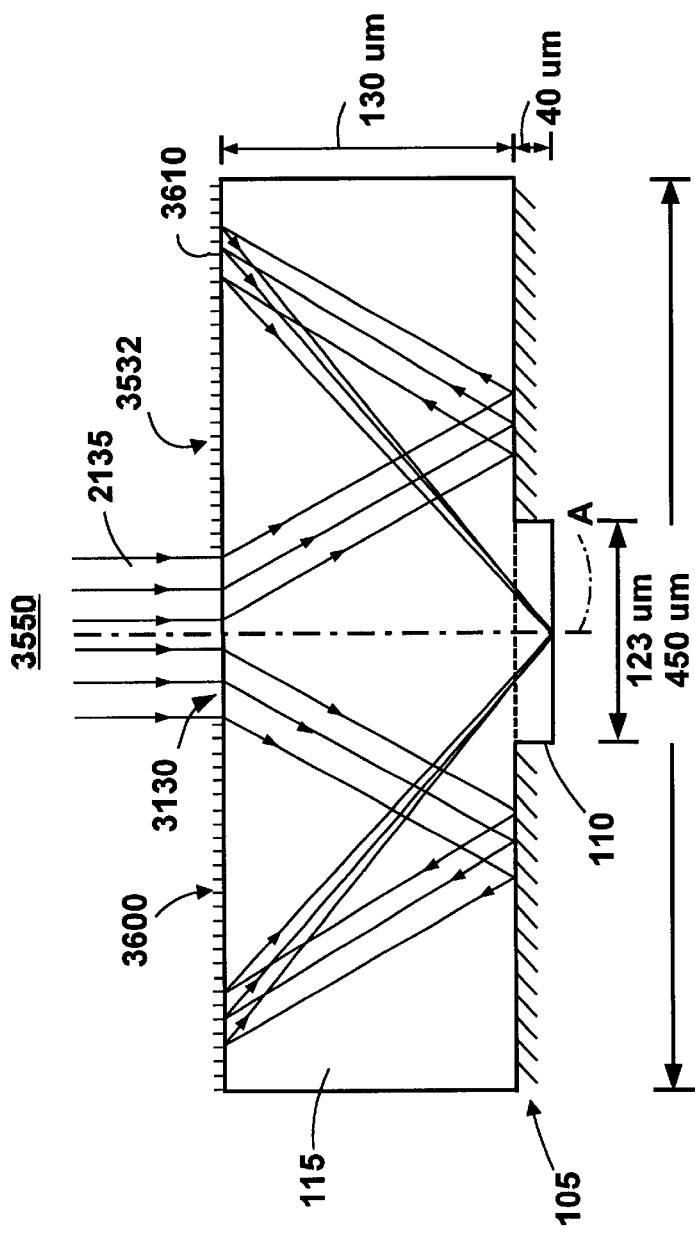
FIG. 35
FIG. 37
FIG. 36

HIGH NUMERICAL APERTURE OPTICAL FOCUSING DEVICE FOR USE IN DATA STORAGE SYSTEMS

CROSS-REFERENCE TO RELATED APPLICATIONS

This is a continuation-in-part application of U.S. patent application titled "Near Field Magneto-Optical Head Made Using Wafer Processing Techniques", Ser. No. 09/111,098, filed on Jul. 6, 1998 now U.S. Pat. No. 6,130,779 issued Oct. 10, 2000, assigned to the same assignee as the present application, which is incorporated herein by reference in its entirety.

This application further claims the priority of the following provisional U.S. patent applications, filed by the same assignee as the present application, all of which are incorporated herein by reference:

Ser. No. 60/091,788, filed on Jul. 6, 1998, and titled "High NA Solid Catadioptric Focusing device Having A Flat Kinoform Phase Profile";

Ser. No. 60/091,784, filed on Jul. 6, 1998, and titled "High NA Catadioptric Optical focusing device Having Flat Diffractive Surfaces"; and Ser. No. 60/091,787, filed on Jul. 6, 1998, and titled "Near Field Magneto-Optical Head Made Using Wafer Processing Techniques".

This application relates to U.S. patent application Ser. No. 09/179,279; now U.S. Pat. No. 6,130,779 issued on Oct. 10, 2000 titled "High Numerical Aperture Optical Focusing Device Having a Conical Incident Facet and a Parabolic Reflector for Use in Data Storage Systems", and filed concurrently with the present application, and assigned to the same assignee as the present application.

BACKGROUND OF THE INVENTION

1. Field of the Invention

The present invention relates in general to optical focusing devices, and it particularly relates to a high numerical aperture (NA) optical focusing device. More specifically, the present invention relates to an optical focusing device having a conically shaped incident facet, for use in data storage systems such as optical and magneto-optical (MO) disk drives.

2. Description of Related Art

In a MO storage system, a thin film read/write head includes an optical assembly for directing and focusing an optical beam, such as a laser beam, and an electro-magnetic coil that generates a magnetic field for defining the magnetic domains in a spinning data storage medium or disk. The head is secured to a rotary actuator magnet and a voice coil assembly by a suspension and an actuator arm positioned over a surface of the disk. In operation, a lift force is generated by the aerodynamic interaction between the head and the disk. The lift force is opposed by equal and opposite spring forces applied by the suspension such that a predetermined flying height is maintained over a full radial stroke of the rotary actuator assembly above the surface of the disk.

A significant concern with the design of the MO head is to increase the recording or areal density of the disk. One attempt to achieve objective has been to reduce the spot size of the light beam on the disk. The diameter of the spot size is generally inversely proportional to the numerical aperture (NA) of an objective lens forming part of the optical assembly, and proportional to the wavelength of the optical beam. As a result, the objective lens is selected to have a large NA. However, the NA in objective lenses can be 1 if the focusing spot were in air, thus limiting the spot size.

Another attempt to reduce the spot size and to increase the recording areal density has been to use solid immersion lenses (SILs) with near field recording, as exemplified by the following references:

U.S. Pat. No. 5,125,750, titled "Optical Recording System Employing a Solid Immersion Lens".

U.S. Pat. No. 5,497,359, titled "Optical Disk Data Storage System With Radiation-Transparent Air-Bearing Slider".

Yet another attempt at improving the recording head performance proposes the use of near-field optics, as illustrated by the following reference:

U.S. Pat. No. 5,689,480, titled "Magneto-Optic Recording System Employing Near Field Optics".

A catadioptric SIL system is described in the following references, and employs the SIL concept as part of the near-field optics:

Lee, C. W., et al., "Feasibility Study on Near Field Optical Memory Using A Catadioptric Optical System", Optical Data Storage, Technical Digest Series, Volume 8, pages 137–139, May 10–13, 1998; and "Parallel Processing", 42 Optics and Photonics News, pages 42–45, Jun. 1998.

While this catadioptric SIL system can present certain advantages over conventional SILs, it does not appear to capture the entire incident, collimated beam. This represents a waste of valuable energy that could otherwise increase the evanescent optical field.

Other concerns related to the manufacture of MO heads are the extreme difficulty and high costs associated with the mass production of these heads, particularly where optical and electromagnetic components are assembled to a slider body, and aligned for optimal performance.

SUMMARY OF THE INVENTION

One aspect of the present invention is to satisfy the long felt, and still unsatisfied need for a near-field optical or MO data storage system that uses an optical focusing device that has combines a conically (or axicon) shaped incident facet with a peripheral reflector or reflecting surface. According to one design, the peripheral reflector can have a shifted parabola shape. This optical focusing device captures substantially the entire incident beam and the peripheral reflector focuses it at a focal point with extremely small aberrations, thus improving the overall efficiency and performance of the data storage system.

Another aspect of the present invention is to provide an optical focusing device with relatively high manufacturing tolerance values, due largely to its simple structure and insensitivity to axial displacement of the top and bottom surfaces.

Yet another aspect of the present invention is to provide an optical focusing device with a relatively high NA by controlling the conic constant or other coefficients of the incident facet, and the peripheral facet which substantially compensate for the conical factors and the aberrations introduced by each other.

Still another aspect of the present invention is to provide an optical focusing device with quasi-flat facet using diffractive optical elements or Fresnel optics, thus making the mass production fabrication possible.

A further aspect of the present invention is to provide an optical focusing device that adds focusing power to the incident facet, by controlling certain parameter such as the angle or curvature of the incident facet.

The optical focusing device includes an incident central facet having a conical constant, upon which an optical beam impinges, and a high-index glass body through which the incident optical beam passes toward a bottom reflective surface. The bottom reflective surface is substantially flat, and reflects the optical beam through the body, toward a peripheral reflector (also referred to as peripheral reflective surface or facet). The peripheral reflector focuses the optical beam toward a focal plane on which the focal spot is formed. The focal plane is defined within a pedestal that forms part of the optical focusing device, and that extends from the bottom reflective surface. The central facet is conically shaped and optically refractive for refracting the incident optical beam away from the pedestal, onto the bottom reflective surface. The peripheral reflector surrounds the central facet and can have various appropriate shapes, such as generally aspherical, titled parabolic, tilted elliptical, or tilted hyperbolic. The peripheral reflector can be reflective, refractive, diffractive, or a combination thereof.

In a data writing or reading mode, the incident optical beam, such as a laser beam impinges upon the central facet and is refracted or diffracted thereby. The laser beam can be collimated, convergent or divergent, and it passes through the transparent body, and impinges upon the bottom reflective surface. The laser beam is then reflected by the bottom reflective surface, through the body, onto the peripheral reflector. The laser beam is then either reflected, reflected and refracted, or reflected and diffracted by the peripheral reflector to form a focused beam at the focal point. The focal point is preferably located at, or in close proximity to a pedestal edge, along a central axis, in very close proximity to the disk. This will allow the focused optical beam to propagate toward, or penetrate the disk through evanescent wave coupling, for enabling the transduction of data to and from the disk.

BRIEF DESCRIPTION OF THE DRAWINGS

The features of the present invention and the manner of attaining them will become apparent, and the invention itself will be understood by reference to the following description and the accompanying drawings, wherein:

FIGS. 12 through 22 illustrate processes of manufacturing the head according to the present invention;

FIG. 35 is an enlarged, side elevational view of another optical focusing device according to the present invention, including a peripheral reflector and a central facet;

FIG. 36 is a greatly enlarged of a microstructure or grating forming part of the central facet of FIG. 35;

FIG. 37 is a greatly enlarged of a micro-structure or grating forming part of the peripheral reflector of FIG. 35.

Similar numerals in the drawings refer to similar or identical elements. It should be understood that the sizes of the different components in the figures might not be in exact proportion, and are shown for visual clarity and for the purpose of explanation.

DETAILED DESCRIPTION OF THE INVENTION

Figure 1:
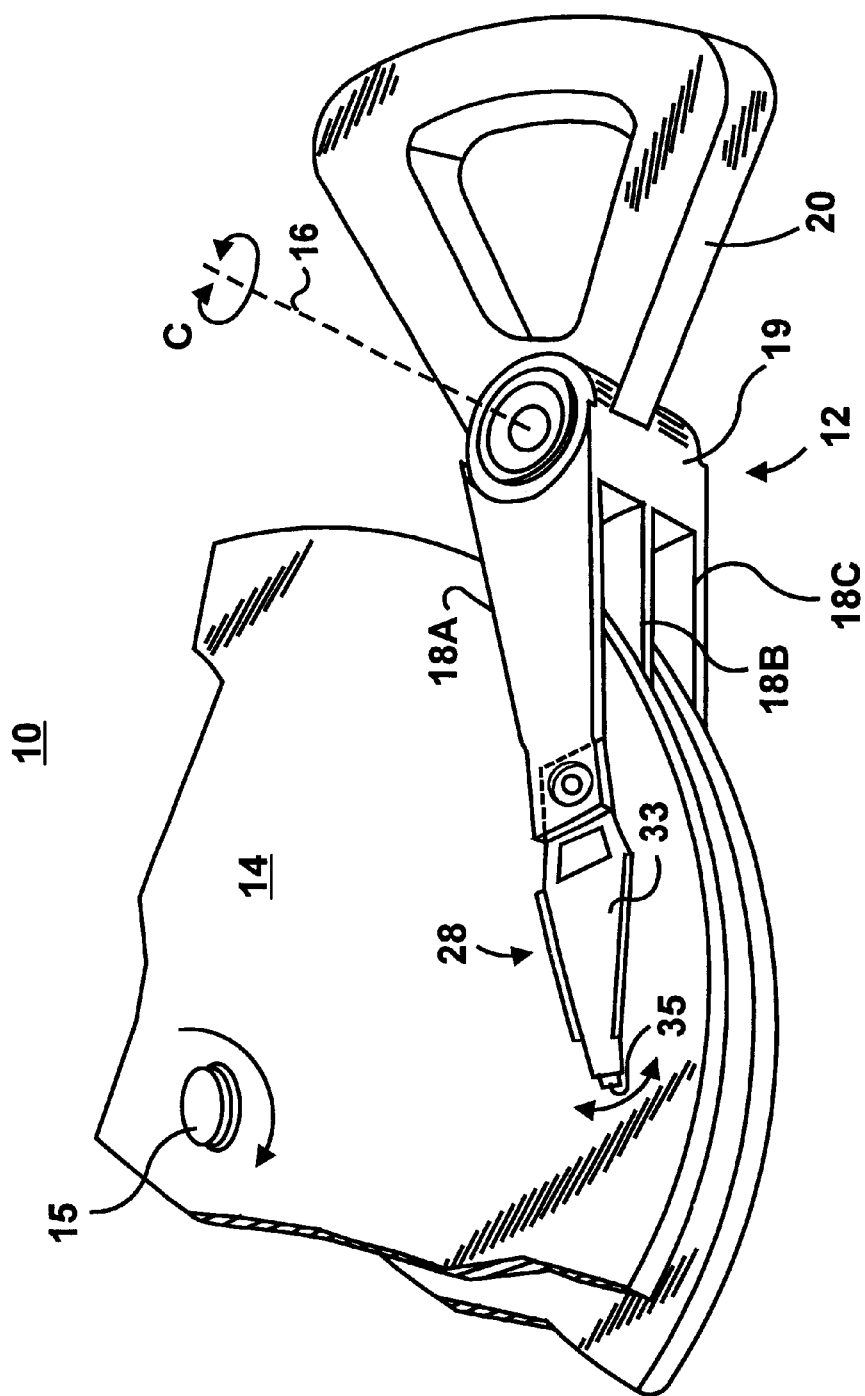
FIG. 1 is a fragmentary perspective view of a data storage system utilizing a read/write head comprised of an optical focusing device according to the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. A voice coil 20 cooperates with a stator (not shown) for rotating in an arc about the actuator axis 16. Energizing voice coil 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
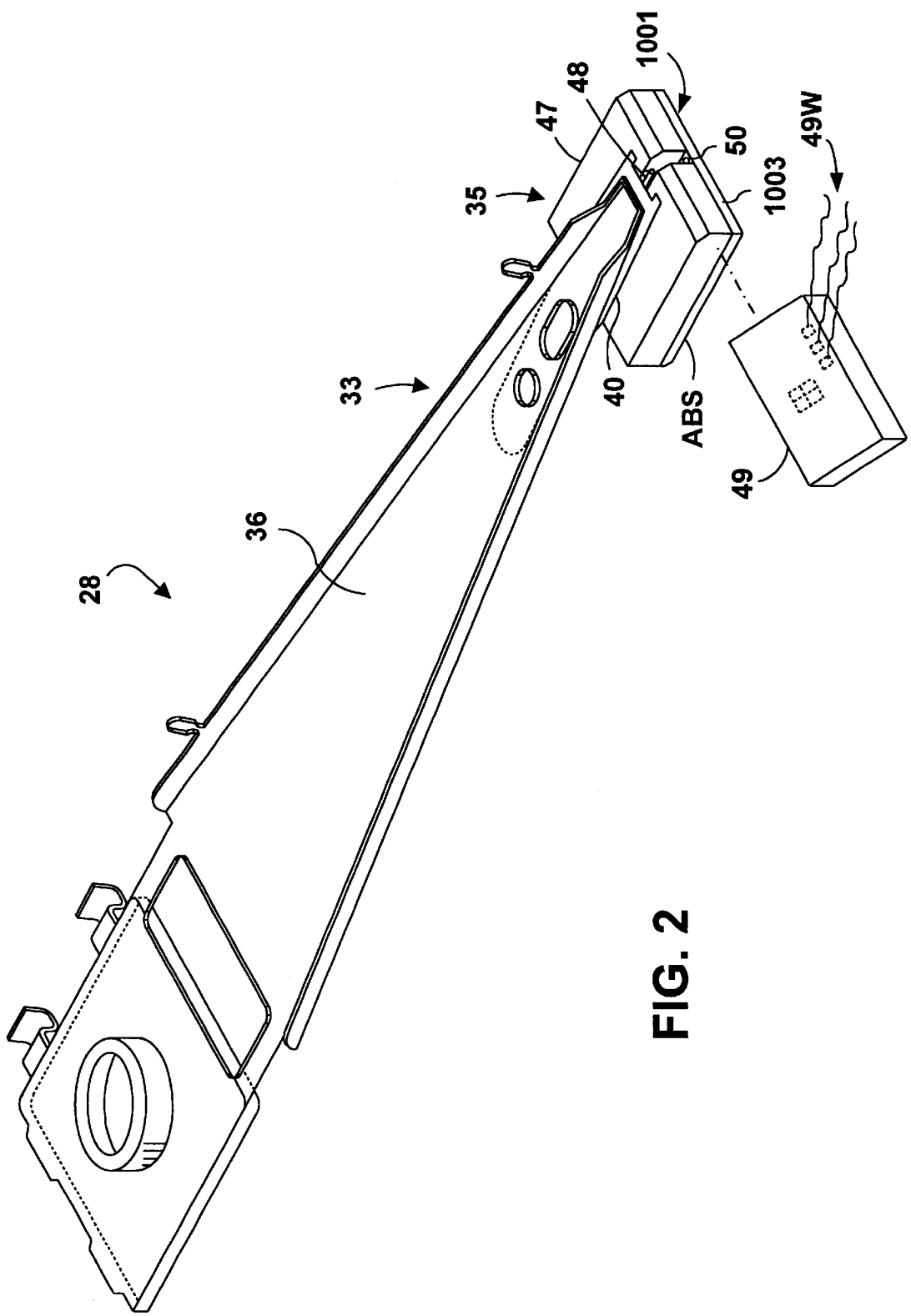
FIG. 2 is a perspective view of a head gimbal assembly comprised of a suspension and a slider to which the read/write head of FIG. 1 is secured, for use in a head stack assembly.

A head gimbal assembly (HGA) 28 is secured to each of the actuator arms, for instance 18A. With further reference to FIG. 2, the HGA 28 is comprised of a suspension 33 and a read/write head 35. The suspension 33 is formed of a load beam 36 and a flexure 40 to which the head 35 is secured.

Figure 23:
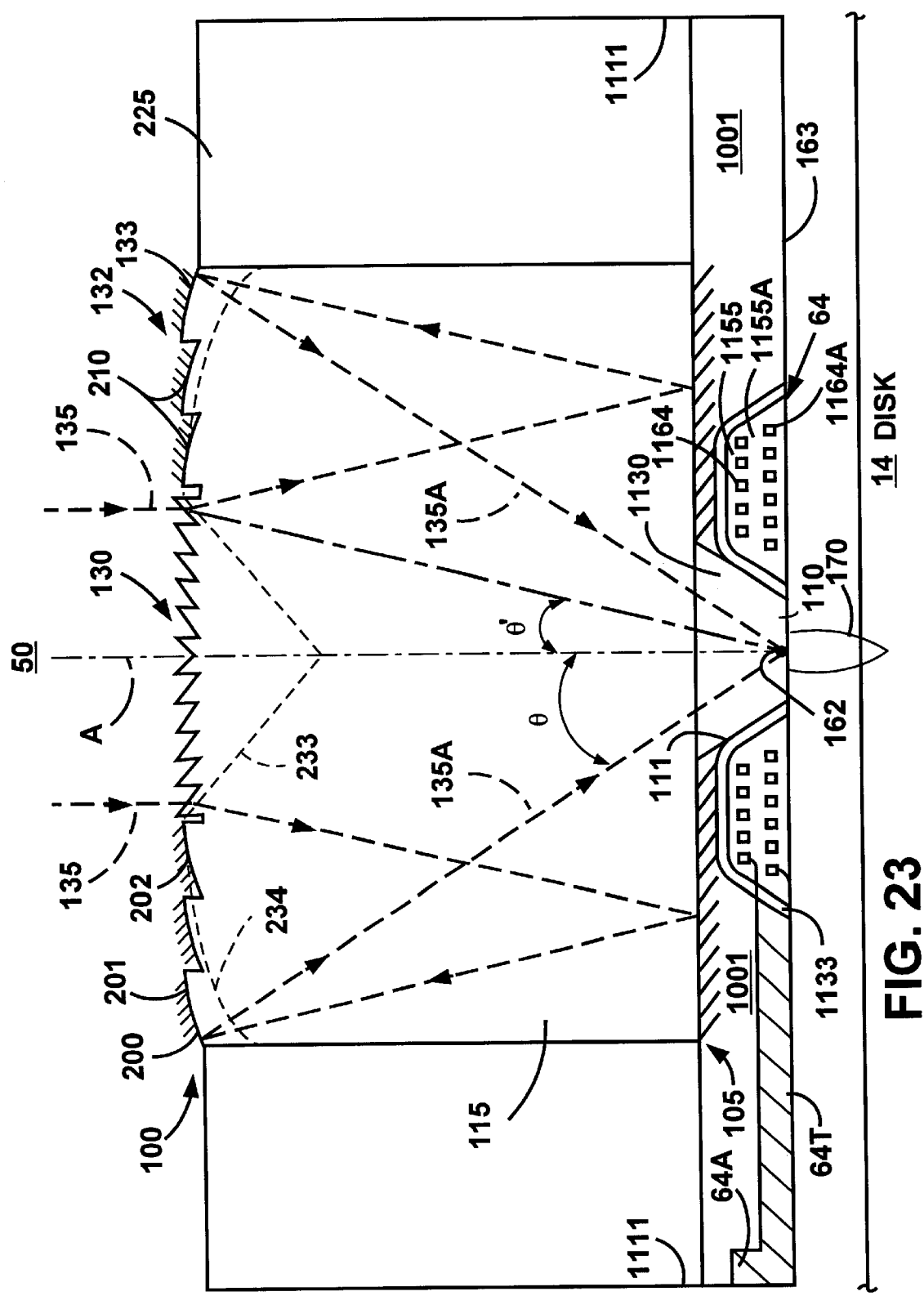
FIG. 23 is an enlarged, side elevational view of an optical focusing device forming part of the read/write head of FIGS. 1 and 2 made according to the present invention, and illustrating an optical beam path through the optical focusing device.

The head 35 is formed of a slider body (or slider) 47 that is secured to the free end of the load beam 36 by means of the flexure 40, and a lens/coil plate 1001 that is secured to the slider body 47. The lens/coil plate 1001 comprises a substrate 1003 on (or within) which an optical focusing device or lens 50 is formed on a first (or upper) side 1004 (FIG. 4). With further reference to FIG. 23, the lens/coil plate 1001 also includes a coil or coil assembly 64 secured to a pedestal 110 for generating a desired write magnetic field. As is schematically illustrated by a block drawn in dashed lines in FIG. 3, and as it will be explained later in greater detail, the coil 64 is formed on (or within) a second (or bottom) side 1006 of the lens/coil plate 1001, opposite to, and in alignment with the optical focusing device 50.

Figure 3:
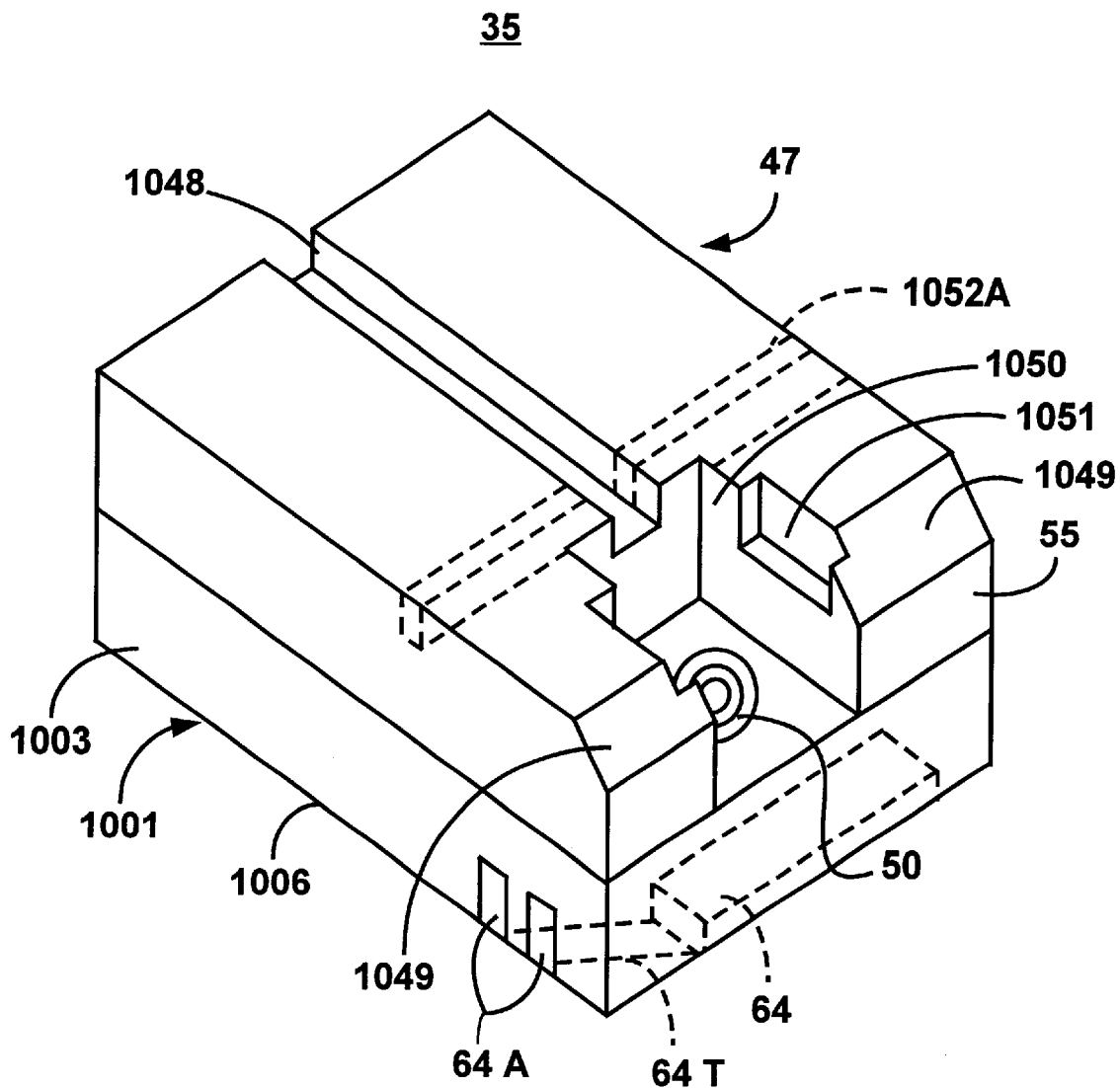
FIG. 3 is an enlarged perspective view of an assembled head showing an optical focusing device according to the present invention.
Figure 4:
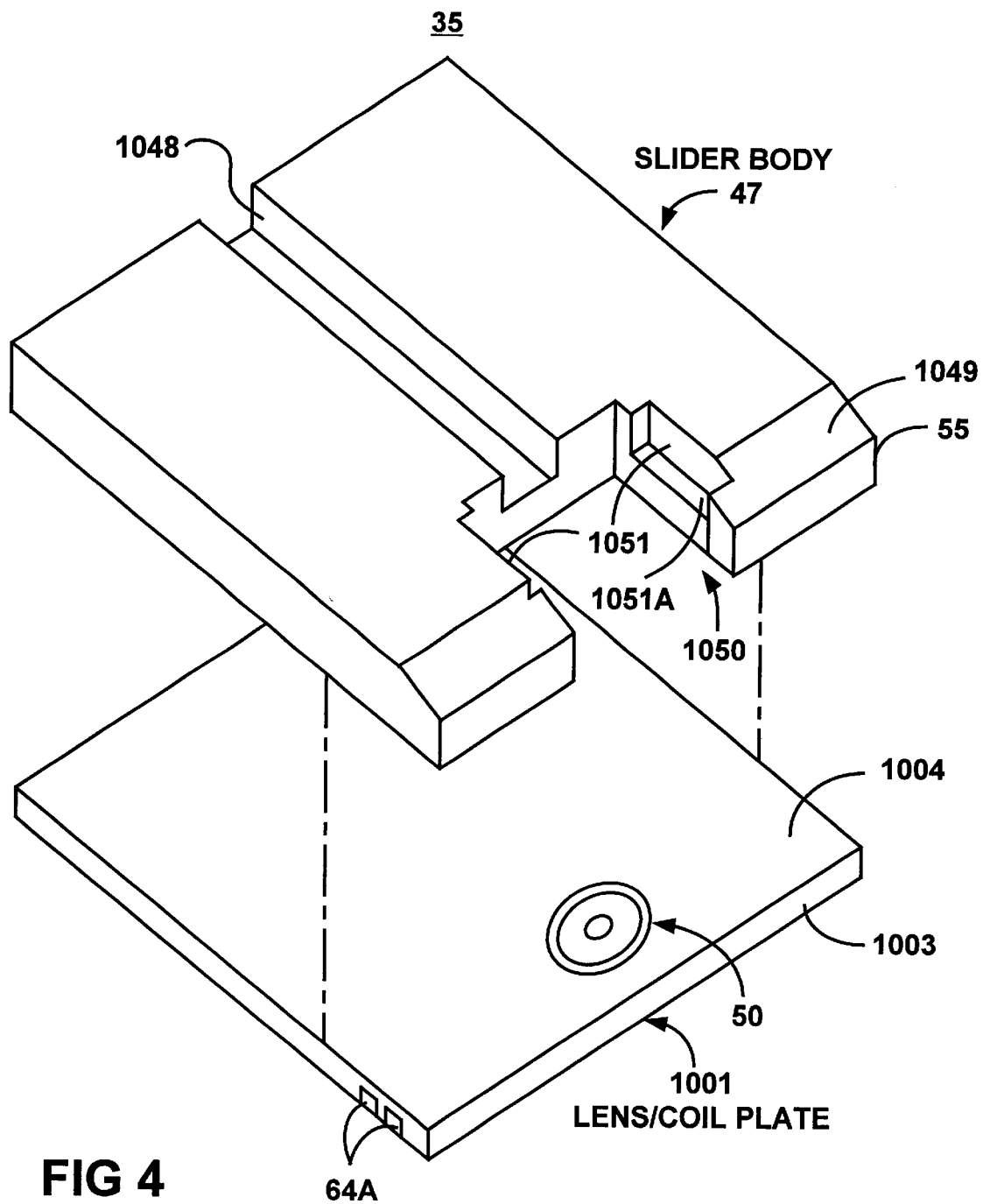
FIG. 4 is an exploded view of the head of FIG. 3, illustrating a slider body and a lens/coil plate.

With reference to FIGS. 2 through 4, the head 35 further includes an optical beam delivery mechanism, such as a waveguide, a channel, or a fiber 48. A stationary or a micro-machined dynamic reflective surface, such as a mirror 49, is secured to a trailing edge 55 of the slider body 47 at a 45 degree angle relative to the optical beam emanating from the fiber 48, to reflect the optical beam onto the optical focusing device 50, in order to transduce data to and from the storage medium 14 (FIG. 23).

The slider body 47 can be a conventional slider or any other suitable slider. In the present illustration, the slider body 47 includes a fiber channel 1048 for receiving the optical fiber 48. Though the fiber channel 1048 is illustrated as being centrally located, i.e., along a generally central axis of the slider body 47, it should be understood that the location of the fiber channel 1048 can be offset relative to the central axis. In a design where the optical beam is delivered through free space, for example when a fiber is not used, the optical beam can be transmitted through the fiber channel 1048 or a waveguide formed within the fiber channel 1048.

The slider body 47 further includes an optical opening 1050, which in this example, extends from, and is wider than the fiber channel 1048. The optical opening 1050 is formed in the slider trailing edge 55. The slider body 47 also includes two quarter-wave plate notches 1051 (FIG. 4) that are formed symmetrically relative to the optical opening 1050, in two opposite sides of the slider body 47. The quarter wave-plate notches 1051 cooperate to receive and retain a quarter wave-plate or any other suitable optical component 1052 (FIGS. 5–7) that assists in guiding and focusing the optical beam 135 (FIG. 23) emanating from the optical fiber 48.

With particular reference to FIG. 4, each quarter wave-plate notch 1051 is defined by a shelf 1051A on which the quarter-wave plate 1052 rests. According to another embodiment, the shelves 1051A can be eliminated and the quarter-wave plate 1052 can be provided with one or more stands (not shown) to support the quarter-wave plate 1052 on the lens/coil plate 1001 and elevate it above the lens 50.

According to another embodiment, when the optical beam 135 is transmitted through free-space, the quarter-wave plate 1052 and the quarter wave-plate notches 1051 can be eliminated altogether.

A sloped surface 1049 can be formed on one or both sides of the trailing edge 55 relative to the optical opening 1050, in order to support the mirror 49 at the desired angle, for reflecting the optical beam 135 emanating from the fiber 48, through the quarter-wave plate 1052, the optical focusing device 50, and the coil assembly 64, onto the disk 14 (FIG. 23). As illustrated in FIGS. 3 and 4, the optical opening 1050 extends through the entire height of the slider body 47.

Figure 7:
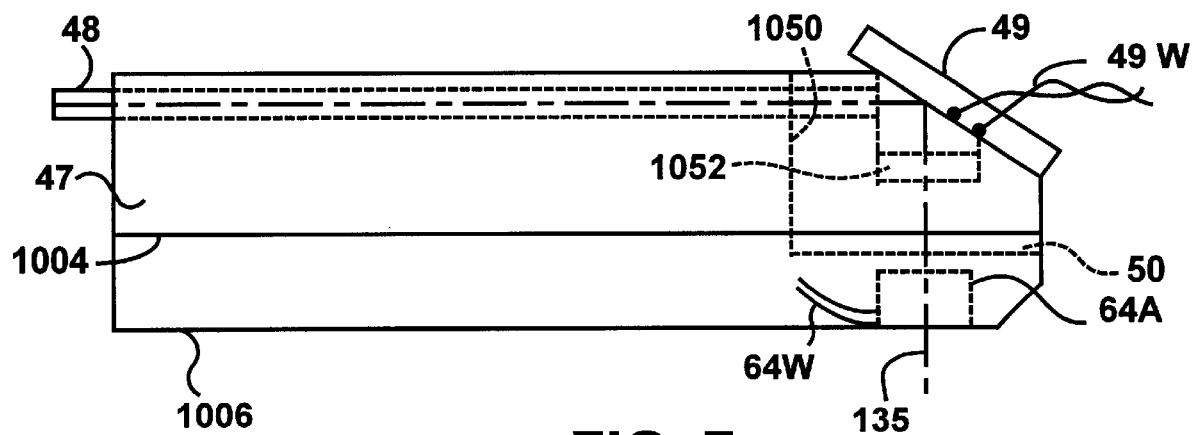
FIG. 7 is a side elevational view of the head of FIGS. 5 and 6.

Optionally, an adhesive relief channel 1052A, shown in dashed lines in FIG. 3, can be formed in the upper surface of the slider body 47, transversely, i.e., at an angle, relative to the fiber channel 1048. The adhesive relief channel 1052 is preferably deeper than the fiber channel 1048, so that excess adhesive flows within the adhesive relief channel 1052, and is thus prevented from overflowing into the optical opening 1050 and from interfering with the optical path of the optical beam 135 (FIG. 7). The fiber 48 (FIG. 5) can be positioned and aligned within the fiber channel 1048 (FIG. 5) by translating it along the length of the fiber channel 1048. Preferably but not necessarily, the tip of the fiber 48 projects within the optical opening 1050. It should be clear that other channels and openings can be patterned within the slider body 47, for example to receive optical components, including but not limited to lenses, beam splitters, etc. to enhance the optical performance of the head 35.

The lens/coil plate 1001 is secured to the slider body 47, such that the optical focusing device 50 (or lens) is positioned substantially underneath the optical opening 1050, in optical alignment with the fiber 48, the mirror 49, the quarter-wave plate 1052, and the coil assembly 64.

Figure 5:
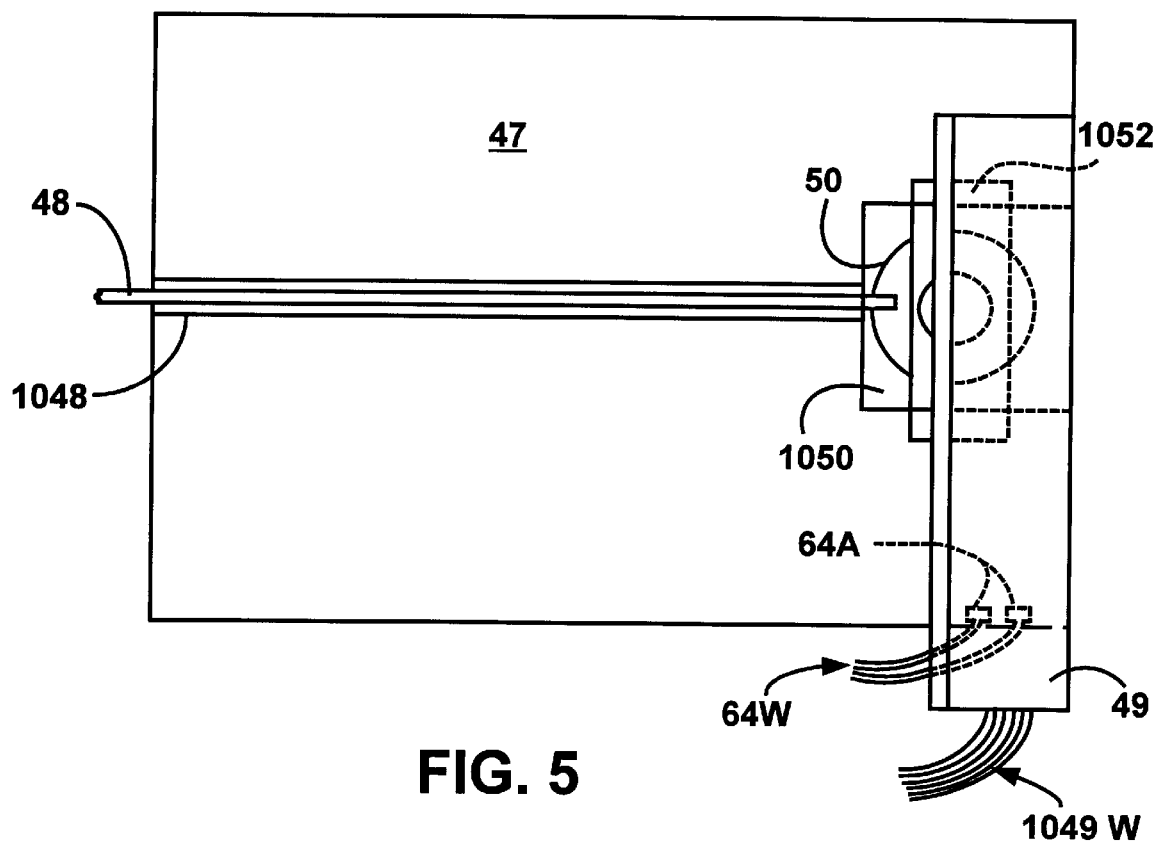
FIG. 5 is a top plan view of the head of FIG. 3, shown assembled to a reflective surface (i.e., mirror), a quarter-wave plate, an optical fiber, a coil, mirror wires, and the lens coil plate of FIG. 4.
Figure 6:
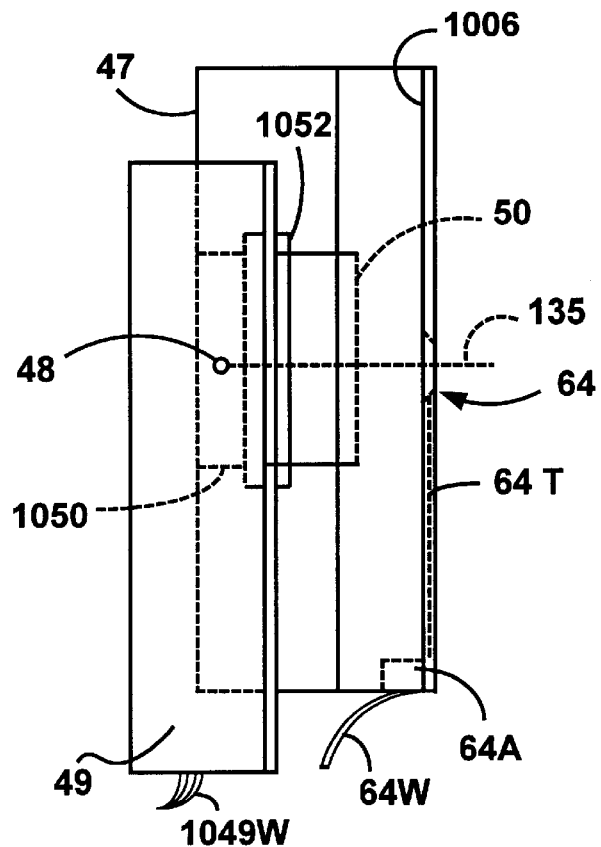
FIG. 6 is a front elevational view of the head of FIG. 5.

Two contact pads 64A (FIG. 3) are formed in the side of the substrate 1003, as will be described below, for connection to coil wires 64W (FIGS. 5–7). As further illustrated in FIG. 23, wire traces 64T connect the coil assembly 64 and the contact pads 64A. The coil wires 64W conduct an electrical current through the coil assembly 64 for energizing it.

Figure 11:
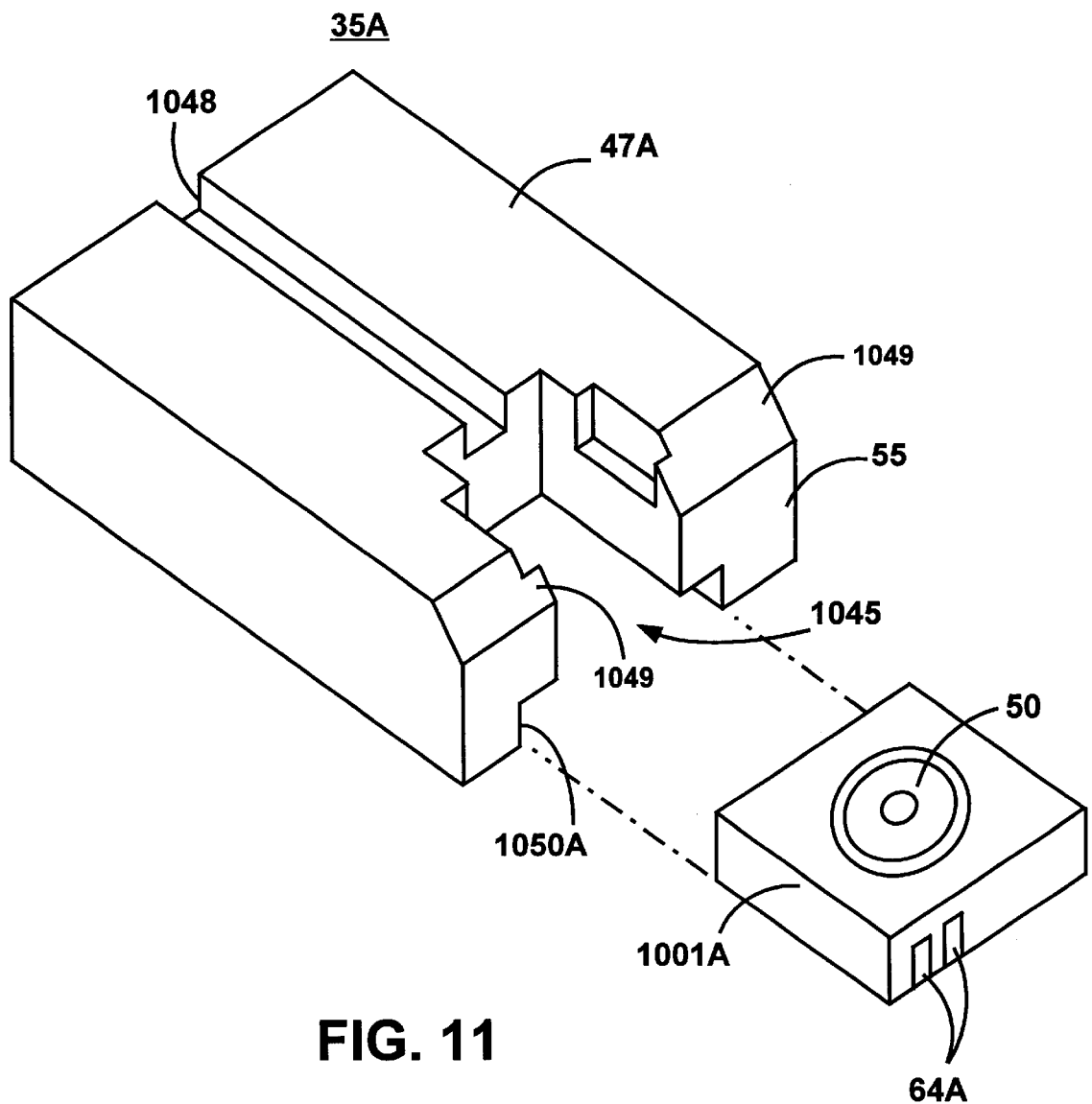
FIG. 11 is a perspective, exploded view of another head design, illustrating a slider body in the process of being assembled to an individual optical focusing device made according to the present invention.

FIG. 11 illustrates another head 35A which is basically similar in function to the head 35. The head 35A includes a slider body 47A that is similar to the slider body 47, with the exception that the slider body 47A includes an opening 1050A for receiving a lens/coil plate 1001A, within or on which the optical focusing device 50 and the coil assembly 64 are formed according to the present invention. In this design, the lens/coil plate 1001A is individually fitted within the opening 1050A and secured to the slider body 47A, for example by means of epoxy.

Figure 8:
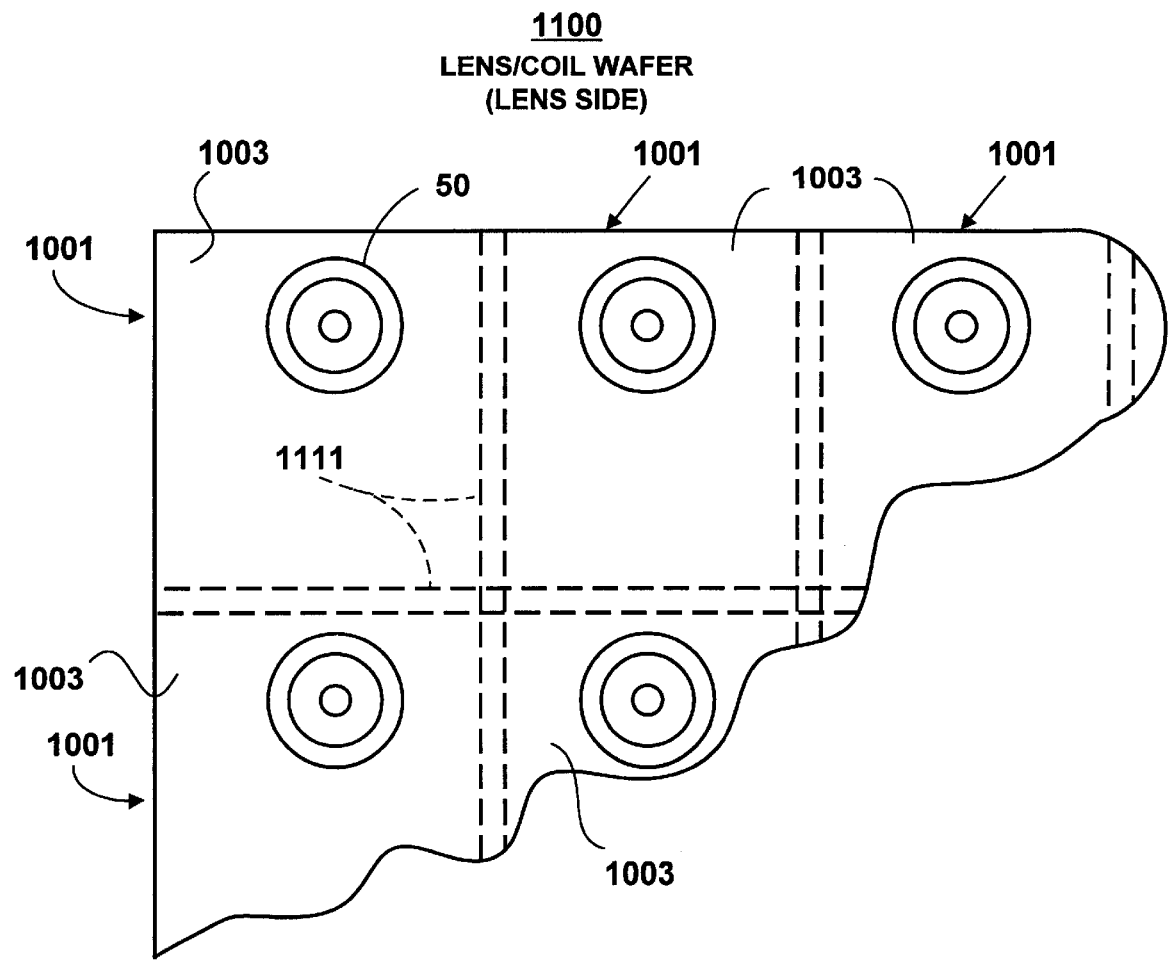
FIG. 8 is a fragmentary, top plan view of a lens/coil wafer, shown from the lens (or optical focusing device) side, on which a plurality of lens/coil plates of FIG. 4, are formed, and illustrating a plurality of optical focusing devices.
Figure 9:
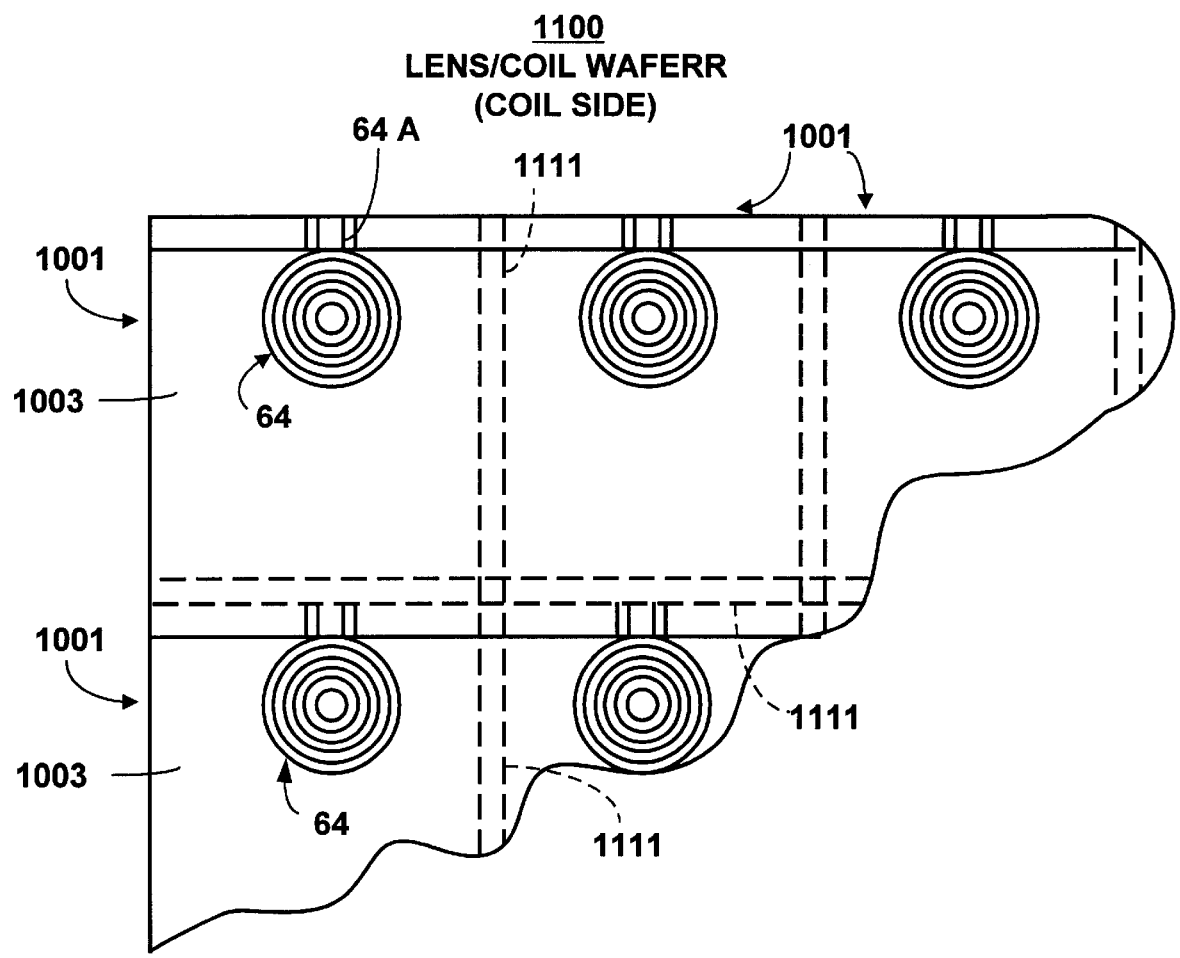
FIG. 9 is a fragmentary, bottom plan view of the lens coil wafer of FIG. 8, shown from the coil side, and illustrating a plurality of coils.

FIG. 8 illustrates a lens/coil wafer 1100, shown from the lens side, on which a plurality of substantially identical lens/coil plates 1001 are formed. FIG. 9 is a bottom plan view of the lens coil wafer 1100 of FIG. 8, shown from the coil side, and illustrating a plurality of coil assemblies 64. The thin-film wafer processing of the lens/coil plate 1001 facilitates the mass production and alignment of the lenses 50 and the coil assemblies 64.

Figure 10:
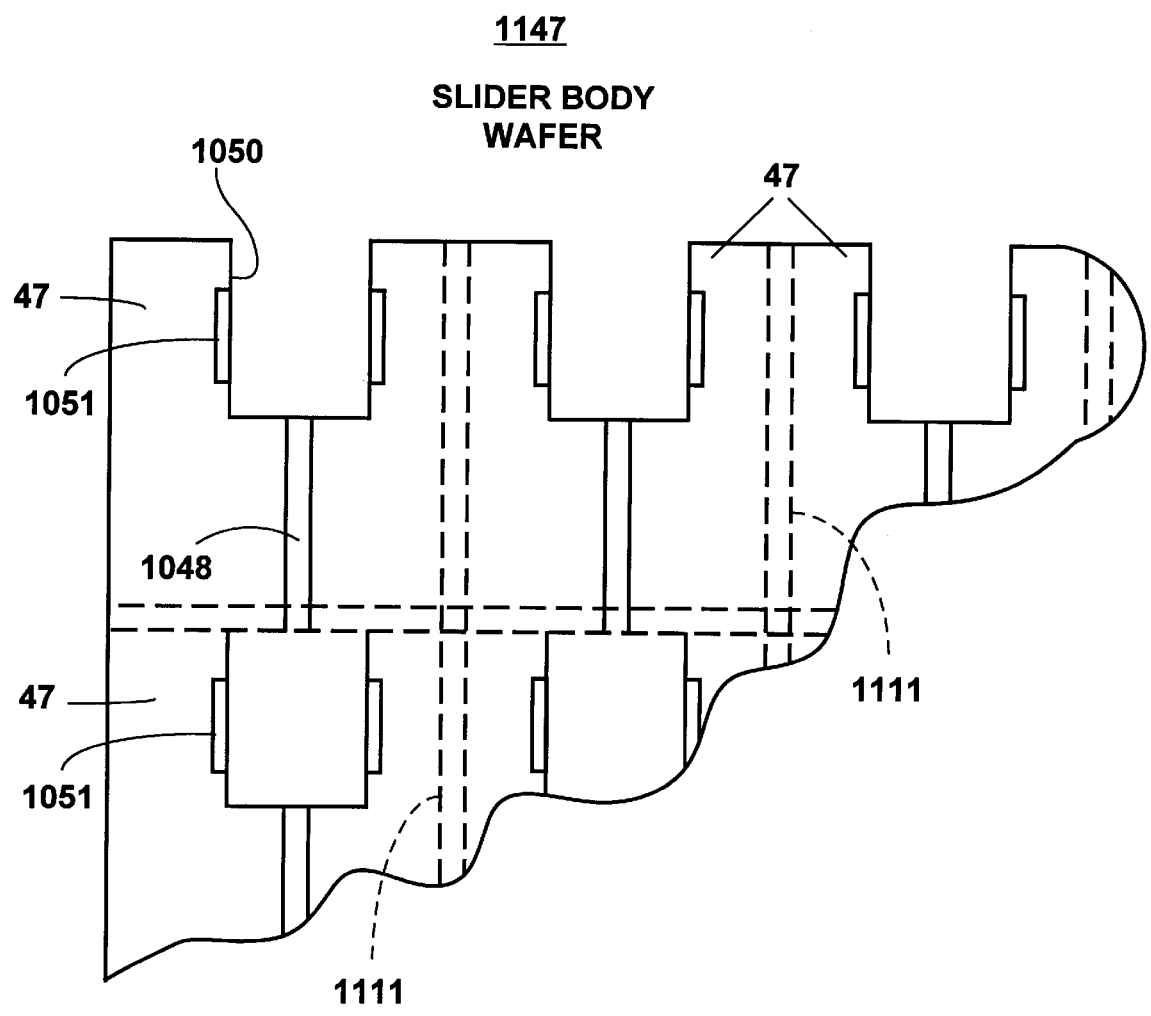
FIG. 10 is a fragmentary, top plan view of a slider body wafer containing a plurality of slider bodies shown in FIG. 4, for assembly to the lens coil wafer of FIGS. 8 and 9.

FIG. 10 illustrates a slider body wafer 1147 containing a plurality of slider bodies 47. The slider body wafer 1147 is assembled to the lens/coil wafer 1100 of FIGS. 8 and 9, by superimposing and aligning the slider body wafer 1147 on the upper surface of the lens/coil wafer 1100 (shown in FIG. 8). Once the two wafers 1147 and 1100 are secured, for example by means of epoxy, sonic bonding, diffusion bonding, anodic bonding, glass fritt bonding, or any other suitable technique, the wafers 1147 and 1100 are sliced into individual, pre-aligned heads 35, along lines 1111 (shown in dashed lines). Referring to FIGS. 6 and 7, the coil wires 64W are then connected to the contact pads 64A, and each head 35 is thereafter fitted with an optical fiber 48, a mirror 49 and a quarter wave-plate 1052.

The method of making and self-aligning the head 35 at a wafer level (without the optical fiber 47, mirror 49, or quarter wave-plate 1052) will now be explained in connection with FIGS. 12 through 22.

A flat glass (or optical) substrate or sheet is molded or pressed either individually, or in batches at a wafer level, as shown for example in FIGS. 15 through 18, to form the lens shapes illustrated, for example in FIGS. 19 through 22. Other lens shapes, such as the shapes shown and described herein can be formed as well using similar techniques.

According to one embodiment, lens caps 1150 (FIGS. 21, 22) are formed separately from, and then secured to the optical substrate by means of suitable techniques, including but not limited to epoxy. The lens caps 1150 can, for example, be UV cured to the optical substrate 1110A.

With reference to FIGS. 19, 20, 23, 24, and 27 through 39, the various patterns, for example 1150A, 130 (central facet), 200, 201, 202, are formed as integral parts of the lens 50 by means of heat pressing, molding processes, or other suitable processes. These lens patterns can alternatively be formed, for example, by photopolymer deposition onto the substrate, followed by forming and etching, including gray scale masking. In some embodiments, the lens patterns, such as 130, 200, 201, 202 (FIGS. 23, 27–29) are substantially flat, while in other embodiments, the lens patterns, such as 2100, 2130, 2230, 2300, 2330, 2400, 2500 2600 (FIGS. 30–34) are conical or arc-shaped. It should be understood that other patterns can assume other shapes to suit specific applications and lens designs.

With reference to FIGS. 19 and 21, coil cavities 64C can be simultaneously formed with the lens patterns, or later by other methods, in order to accommodate the coil assembly 64. Conductive plugs or vias 1125 (FIG. 19) are formed in close proximity to, or in contact with the cutting lines 1111, for subsequent wire bonding attachment to the coil 64. The plugs 1125 are filled with a conductive material such as copper. Upon separation of the individual heads 35 (FIG. 23) along the cutting lines 1111, the plugs 1125 (FIG. 19) become exposed and are referred to as contact pads 64A. As illustrated in FIGS. 4 and 6, the contact pads 64A are then secured to coil wires 64W.

According to one embodiment of the present invention, the plugs 1125 have an arc (or wedge) shape cross section, for preventing the copper filling 1 125C from being detached or removed from the plugs 1125 when the wafers are sliced into individual heads 35. In a preferred embodiment, the plugs 1125 do not extend through the entire depth of the optical wafer, so as to further facilitate the mass production of the integrated heads 35.

With reference to FIGS. 10, 12, and 13, the slider body wafer 1147 can be formed, for example, of silicon. It should be noted that the etching, machining or forming of the fiber channel 1048 can be done subsequent to bonding the slider body wafer 1147 to the lens/coil wafer 1110. The slider body wafer 1147 and the lens/coil wafer 1 1 10 are bonded, using known or available techniques such as: anodic bonding, diffusion, glass bonding using for example glass fritt, or adhesive bonding such as epoxy.

A reflective surface or mirror 1105 is deposited at the bottom surface of the lens/coil wafer 1110 (opposite the lens patterns, e.g. 1150A, 130, 200, 201, 202). If a reflective material were deposited around the pedestal 110 and the plugs 1125, then it is masked and removed.

Figure 14:
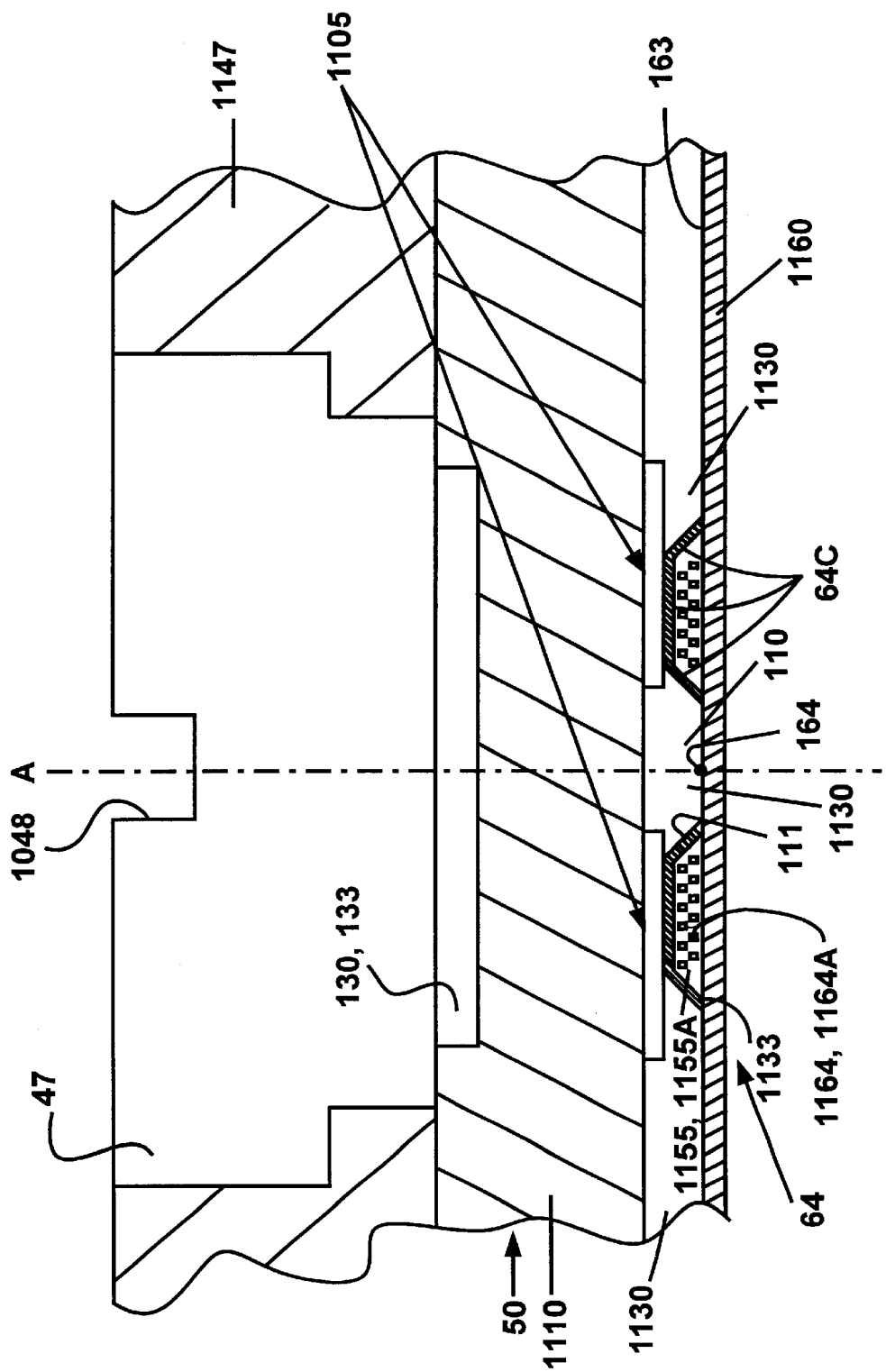
Figure 17:
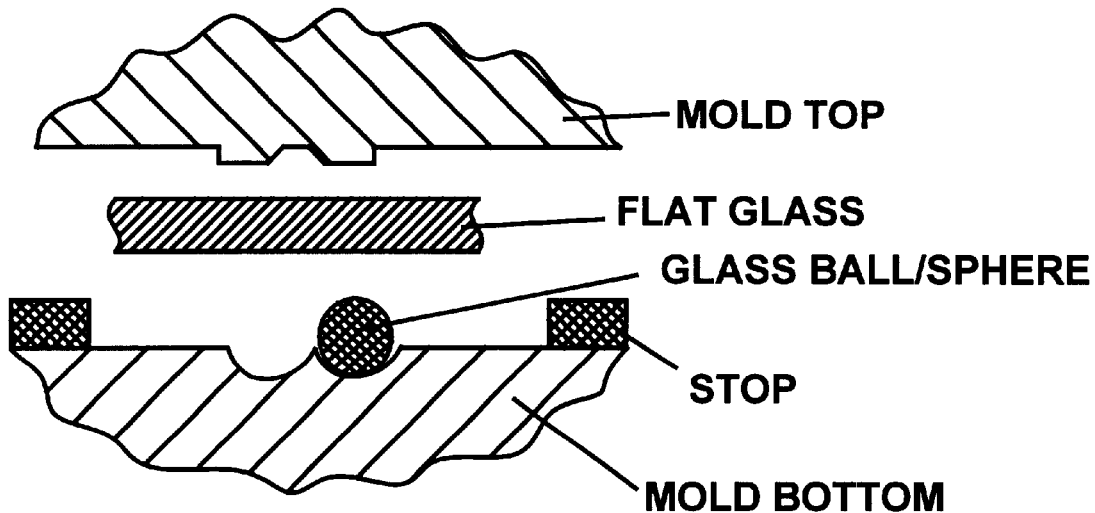
Figure 18:
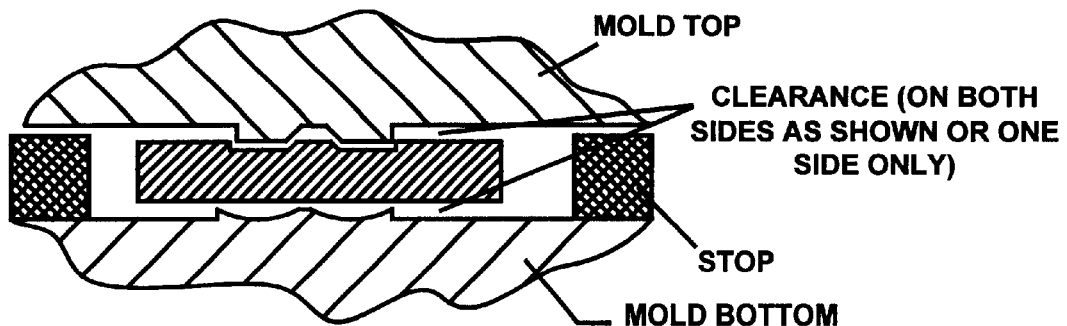

With reference to FIG. 14, a pedestal (or pedestal area) 110 and a coil 64 are then formed on the lens/coil plate 1110 using thin-film processing techniques. In one embodiment the pedestal 110 is formed separately from the lens/coil substrate 1110, while according to another embodiment the pedestal 110 is formed as part of the lens/coil substrate 1110. FIGS. 14 and 23 illustrate a pedestal 110 formed by depositing a layer of transparent material 1130, such as alumina, on the lens/coil substrate 1110 to form the pedestal 110, and to form the cavity or depression 64C (FIG. 19) within which the coil 64 is formed.

The pedestal 110 is shaped appropriately, as desired. In an exemplary preferred embodiment illustrated in FIGS. 14 and 23, the pedestal 110 has a sloped outer side 111 so that the conductors of the coil 64 can be formed in closer proximity to a central axis A, along the optical path of the beam 135. According to another embodiment, the pedestal 110 is formed integrally with lens body 115, and extends below the bottom reflective surface 105.

The steps of forming the coil 64 and the pedestal 110 can be carried out either before or after the slider body wafer 1147 and the lens/coil wafer 1110 are secured together. With reference to FIG. 14, the centers of the fiber channel 1048 and the pedestal 110 are preferably co-aligned with the central axis A and the optical path of the beam 135.

Yoke or flux gathering layers 1133 are then formed by means of lithography and plating in the base and sides of the depressions 64C (FIG. 14), to assume a desired shape. In a preferred embodiment, the yoke 1133 covers multi-layered coil conductors 1164A to optimize the collected magnetic field.

With reference to FIG. 23, an insulating layer 1155 is formed on the yoke 1133, and a first layer of coil conductors 1164 is deposited on the insulating layer 1155 by means of, for example, lithography and plating. A second insulating layer 1155A is then formed on the first layer of coil conductors 1664, and a second layer of coil conductors 1664A is deposited thereon. These steps are repeated until the desired number of coil layers is reached.

A protective layer 1160 (FIG. 14) of insulating and transparent material can optionally be deposited on the final coil layer to provide a protective seal to the coil assembly 64. An alternative approach to forming the coil cavity 64C is to heat press it into the glass wafer as shown in FIGS. 15, 16, 18, 19, 21. Such heat pressing step will precede the step of depositing the reflective surfaces 1105.

The protective layer 1160 is lapped to correct for the lens thickness and to define the proper air bearing surface ABS contour of the slider body 47. The ABS can additionally, or alternatively be formed, by for example etching the protective layer 1160. The heads 35 are then sliced or etched away from the wafer, into individual heads 35. The quarter wave plate 1052, mirror 49, mirror wires 1049W, coil wires 64W, and optical fiber 48 are then assembled to the head 35 and properly aligned, to complete the manufacture of the head 35. The head 35 is then assembled to the suspension 33 as is known in the field to form the HGA 28 (FIG. 2).

The details of the optical focusing device 50 will now be described with reference to FIG. 23. The optical focusing device 50 includes an incident surface 100, a bottom reflective surface 105, the pedestal 110, and a body 115. The incident surface 100 is generally flat and is comprised of a central facet 130 and a peripheral reflector 132.

In one embodiment, the central facet 130 is diffractive and optically transmissive, and the peripheral reflector 132 includes a diffractive or kinoform phase profile 133. The body 115 is optically transparent, and the incident surface 100 is formed on a first side of the body 115. The bottom reflective surface 105 is formed on a second side of the body 115, with the first and second sides being preferably oppositely disposed. The pedestal 110 is formed on the same side as the bottom reflective surface 105.

In a data writing mode, an incident optical beam, such as a laser beam 135 impinges upon the central facet 130, and is diffracted thereby. The incident laser beam 135 can be collimated, convergent or divergent. The laser beam 135 passes through the transparent body 115, and impinges upon the bottom reflective surface 105. The laser beam 135 is then reflected by the bottom reflective surface 105, through the body 115, onto the peripheral reflector 132. The laser beam 135 is then either reflected, refracted, diffracted, reflected and refracted, or reflected and diffracted by the peripheral reflector 132 as a focused beam 135A through the body 115, and is further focused to a focal point 162 located within or on the surface of the pedestal 110 at, or in close proximity to an edge or surface of the pedestal 110 that defines a focal plane 162P. In a preferred embodiment, the focal point 162 is located at the central axis A, in very close proximity to the disk 14, such that a localized evanescent field or light 170 interacts with disk 14, for enabling data to be transduced to and from the disk 14.

The focused beam 135A defines an angle of incidence $\theta$ with a central axis A. It should be clear that the angle of incidence $\theta$ is greater than the angle of incidence $\theta'$ because the optical beam 135 has undergone the sequence of reflection, refraction, and/or diffraction as explained herein. Consequently, the NA of the optical focusing device 50 exceeds that of a conventional objective lens, as supported by the following equation:

$$NA = n . \sin \theta,$$

where n is the index of refraction of the lens body 115. According to the present invention, it is now possible to select the lens body 115 of a material with a high index of refraction n, in order to increase NA.

In one embodiment, the peripheral surface is formed of a profile 133, for example a kinoform phase profile that defines a pattern of refractive profiles i.e., 200, 201, 202. While only three refractive profiles are illustrated, it should be understood that a greater number of refractive profiles can be selected. The pattern of refractive profiles 200, 201, 202 is coated with a reflective layer 210. In another embodiment, the peripheral kinoform phase profile 133 can be replaced with an appropriate diffractive grating or profile, or with an appropriate lens structure such as a Fresnel lens.

Figure 25:
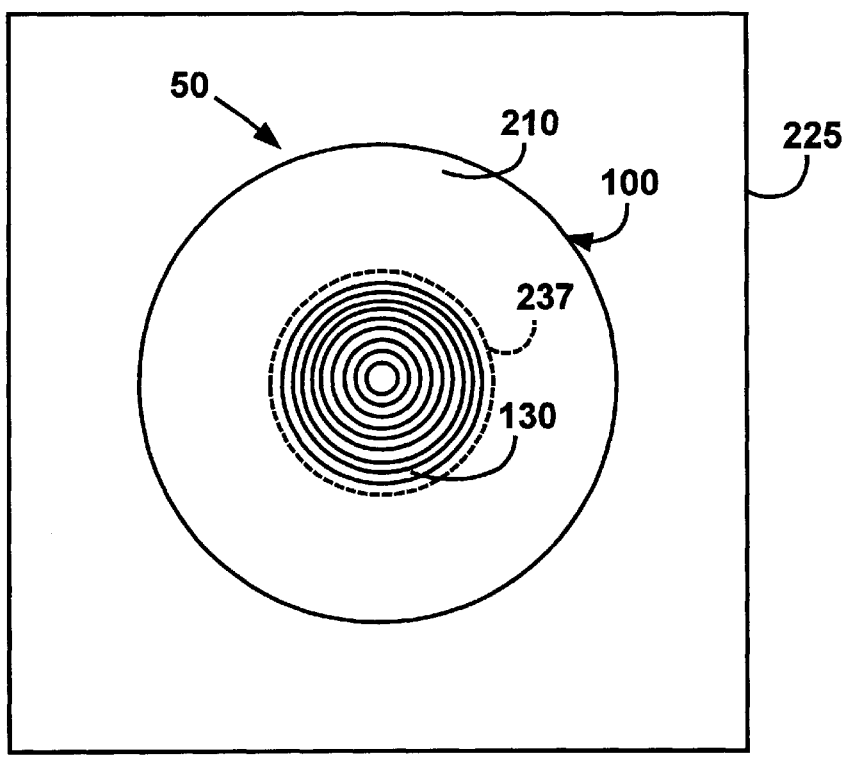
FIG. 25 is a top plan view of the optical focusing devices of FIGS. 23 and 24.
Figure 26:
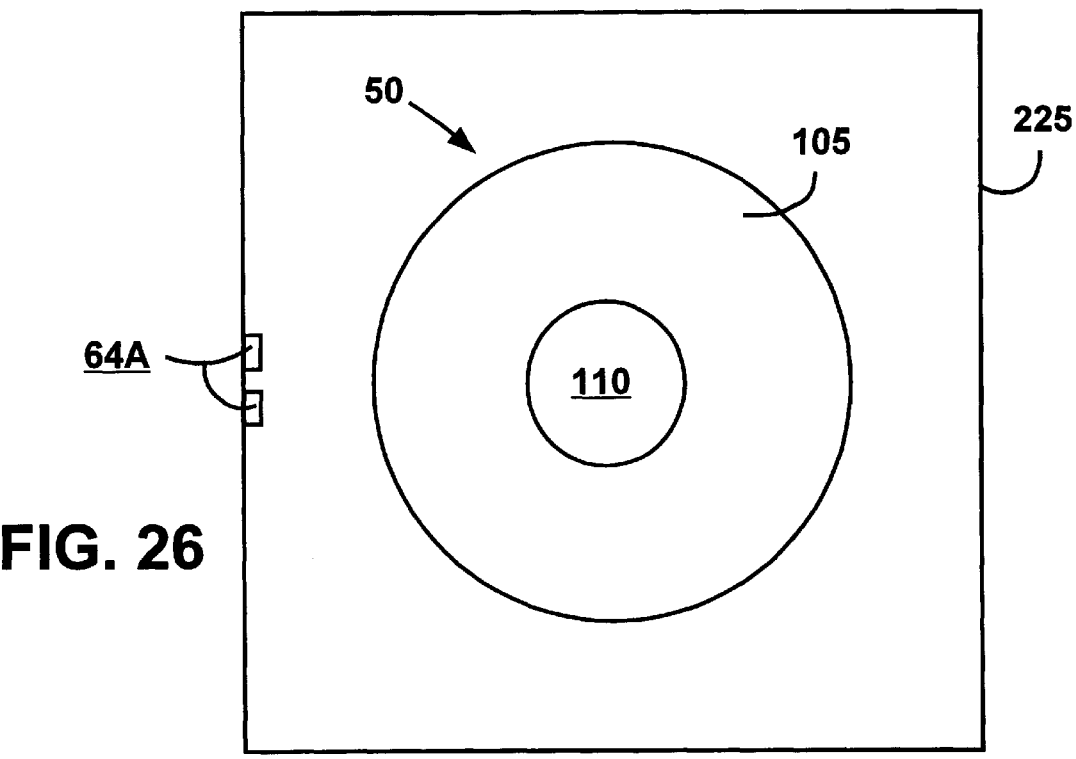
FIG. 26 is a bottom plan elevational view of the optical focusing devices of FIGS. 23 and 24.

With particular reference to FIGS. 25 and 26, the optical focusing device 50 is generally cylindrically shaped with a circular cross-section, and is formed within a substrate 225. The substrate 225 faciliates the handling of the optical focusing device 50. The central facet 130 (FIG. 25) is concentric relative to, and is disposed within the reflective layer 210. The central facet 130 can simulate holographic (or virtual) flat, spherical, conical, aspherical or other suitable diffractive surfaces 233 (shown in dashed lines in FIG. 23), while retaining its generally flat configuration. The reflective layer 210 is ring shaped. In an alternative design, the kinoform phase profile can simulate an aspherical refractive or diffractive surface 234 (shown in dashed lines in FIG. 23), while retaining its generally flat configuration.

The pedestal 110 can be generally conically, cylindrically shaped, or it can have a trapezoidal (or another suitable) cross-section, and is co-axially and concentrically disposed relative to the bottom reflective surface 105. In an alternative embodiment, the central facet 130 includes an alignment ring 237 (shown in dashed lines in FIG. 25), that assists in the alignment of the optical focusing device 50 during assembly to the slider body 47.

As explained herein the optical focusing device 50 can be made using molding, etching, or other suitable manufacturing techniques. The flatness of the incident surface 100 helps facilitate wafer processing techniques to be used to mass assemble a lens wafer in which a plurality of optical focusing devices 50 are formed, to a slider wafer in which a plurality of sliders 47 are formed.

Using the present optical focusing device 50, it is possible to reduce the size of the focal spot 162 (FIG. 23) to 0.3 micron or less. The optical focusing device 50 can be made of any suitable transparent material, including but not limited to glass, crystal, plastic, or a combination thereof.

Figure 24:
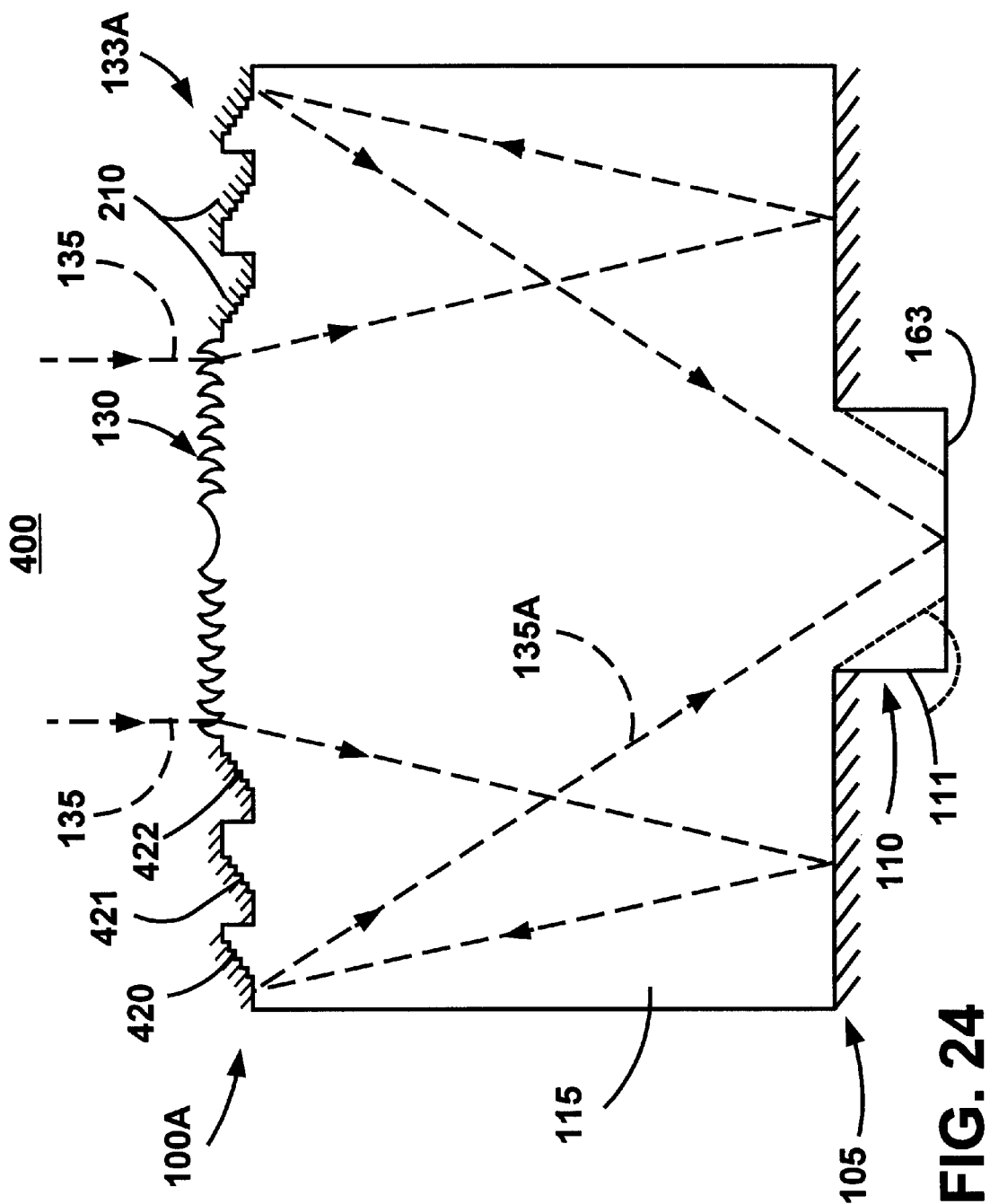
FIG. 24 is an enlarged, side elevational view of another optical focusing device forming part of the read/write head of FIGS. 1 and 2, and made according to the present invention.

FIG. 24 illustrates another optical focusing device 400 according to the present invention. The optical focusing device 400 is generally similar in function and design to the optical focusing device 50, and has its incident surface 100A comprised of a peripheral kinoform phase profile 133A. The peripheral kinoform phase profile 133A includes a pattern of concentric binary refractive profiles i.e., 420, 421, 422 that are coated with a reflective layer 210. The resolution of the refractive profiles 420, 421, 422 can vary, for example increase, in order to obtain a more precise control over the diffraction of the laser beam 135A.

Figure 27:
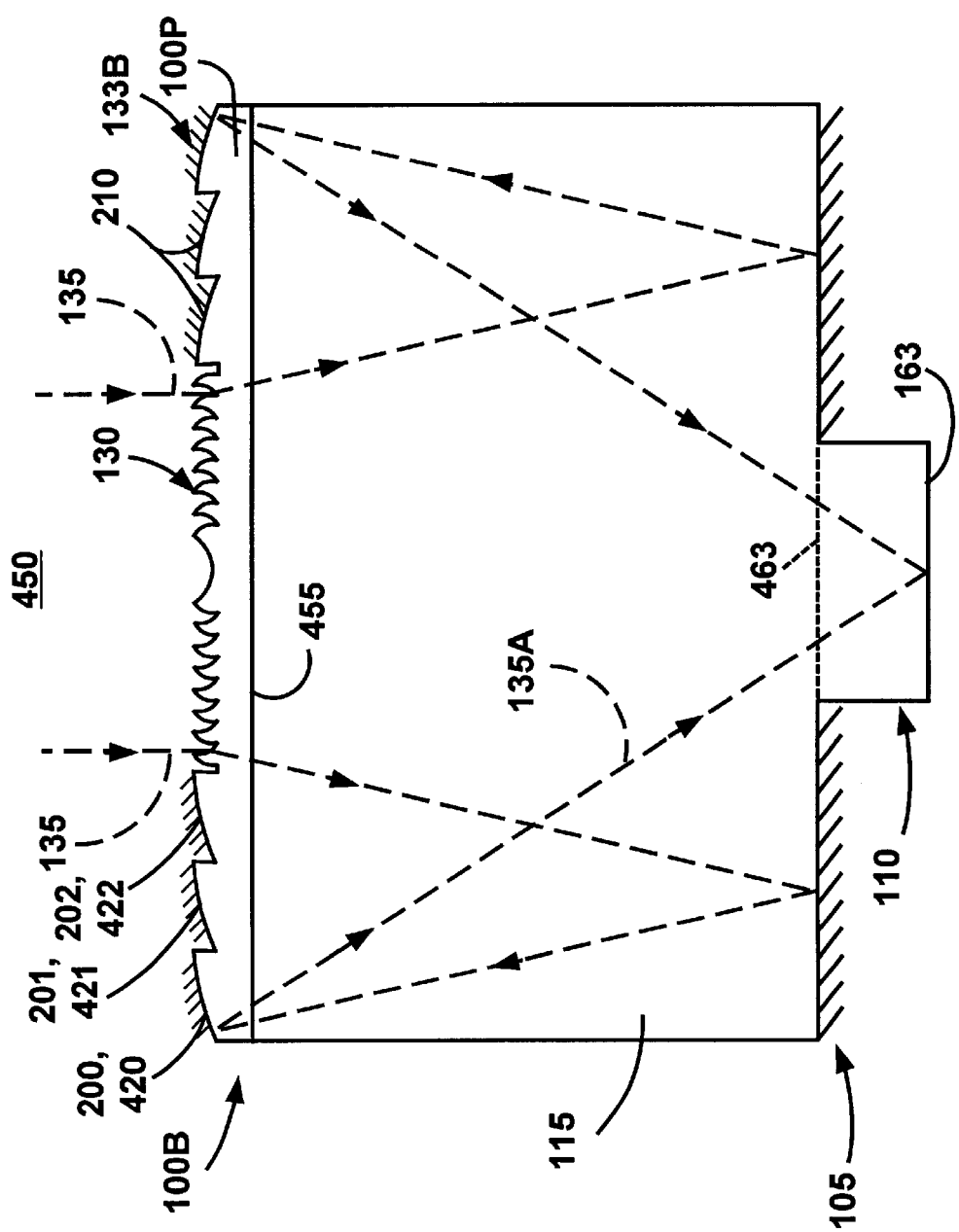
FIGS. 27 through 29 are enlarged, side elevational views of other optical focusing devices forming part of the read/write head of FIGS. 1 and 2, made according to the present invention.

FIG. 27 illustrates another optical focusing device 450 according to the present invention. The optical focusing device 450 is generally similar in function and design to the optical focusing devices 50 (FIG. 23) and 400 (FIG. 24), and has its incident surface 100B comprised of a peripheral phase profile 133B. The peripheral phase profile 133B is formed of a pattern of concentric binary refractive or diffractive profiles i.e., 200, 201, 202 or 420, 421, 422 that are coated with a reflective layer 210. Whereas in the optical focusing devices 50 and 400, the incident facets 100A, 100B are formed integrally with the lens body 115, the incident surface 100B is formed of a separate incident plate or layer 100P (of for example photopolymer) that is secured to the lens body 115 along a generally flat surface 455.

Another optional distinction between the optical focusing device 450 of FIG. 27 and the optical focusing devices 50 and 400 of FIGS. 23 and 24, respectively, is that the pedestal 110 can be made of a separate plate, or deposited material, that is secured to the lens body 115 along a central, non-reflective surface 463 (shown in dashed lines) at the bottom of the lens body 115. The incident plate 100P and the separate pedestal 463 can be used separately or jointly.

Figure 28:
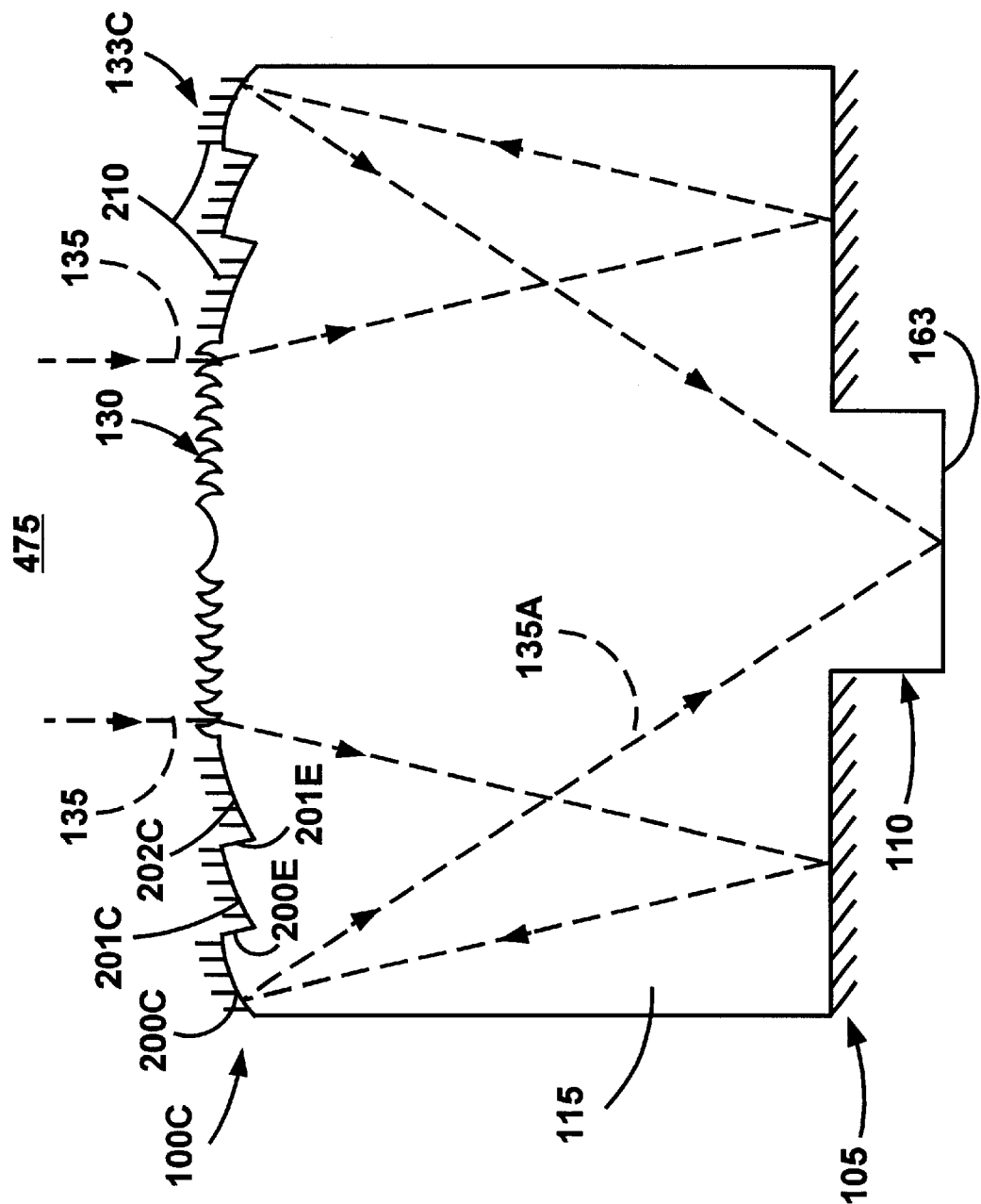

FIG. 28 illustrates another optical focusing device 475 according to the present invention. The optical focusing device 475 is generally similar in function and design to the optical focusing device 50, and has its incident surface 100C comprised of a peripheral phase profile 133C. The peripheral phase profile 133C includes a pattern of refractive or diffractive profiles i.e., 200C, 201C, 202C that are generally similar in function to the profiles i.e., 200, 201, 202. In this embodiment, at least some of the profiles, for example, profile 200C has a tilted edge 200E, and profile 201C has a tilted edge 201E. All the tilted edges 200E, 201E can be angled either positively, or negatively, as desired. According to another embodiment, some of the tilted edges 200E, 201E can be angled positively, while other tilted edges can be angled negatively.

Figure 29:
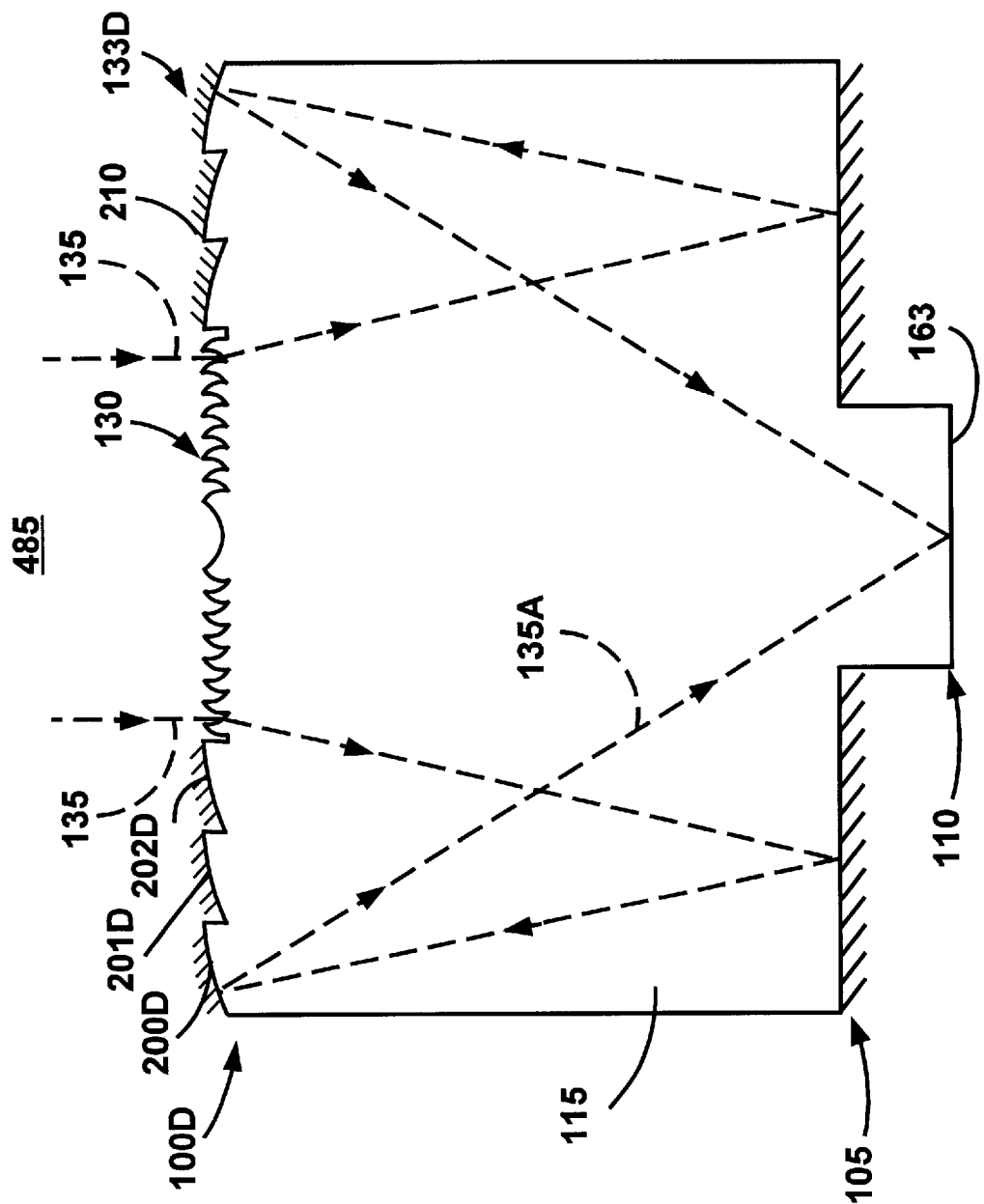

FIG. 29 illustrates another optical focusing device 485 according to the present invention. The optical focusing device 485 is generally similar in function and design to the optical focusing device 50, and has its incident surface 100D comprised of a peripheral phase profile 133D. The peripheral phase profile 133D includes a pattern of refractive or diffractive profiles i.e., 200D, 201D, 202D that are generally similar in function to the refractive profiles i.e., 200, 201, 202.

Figure 30:
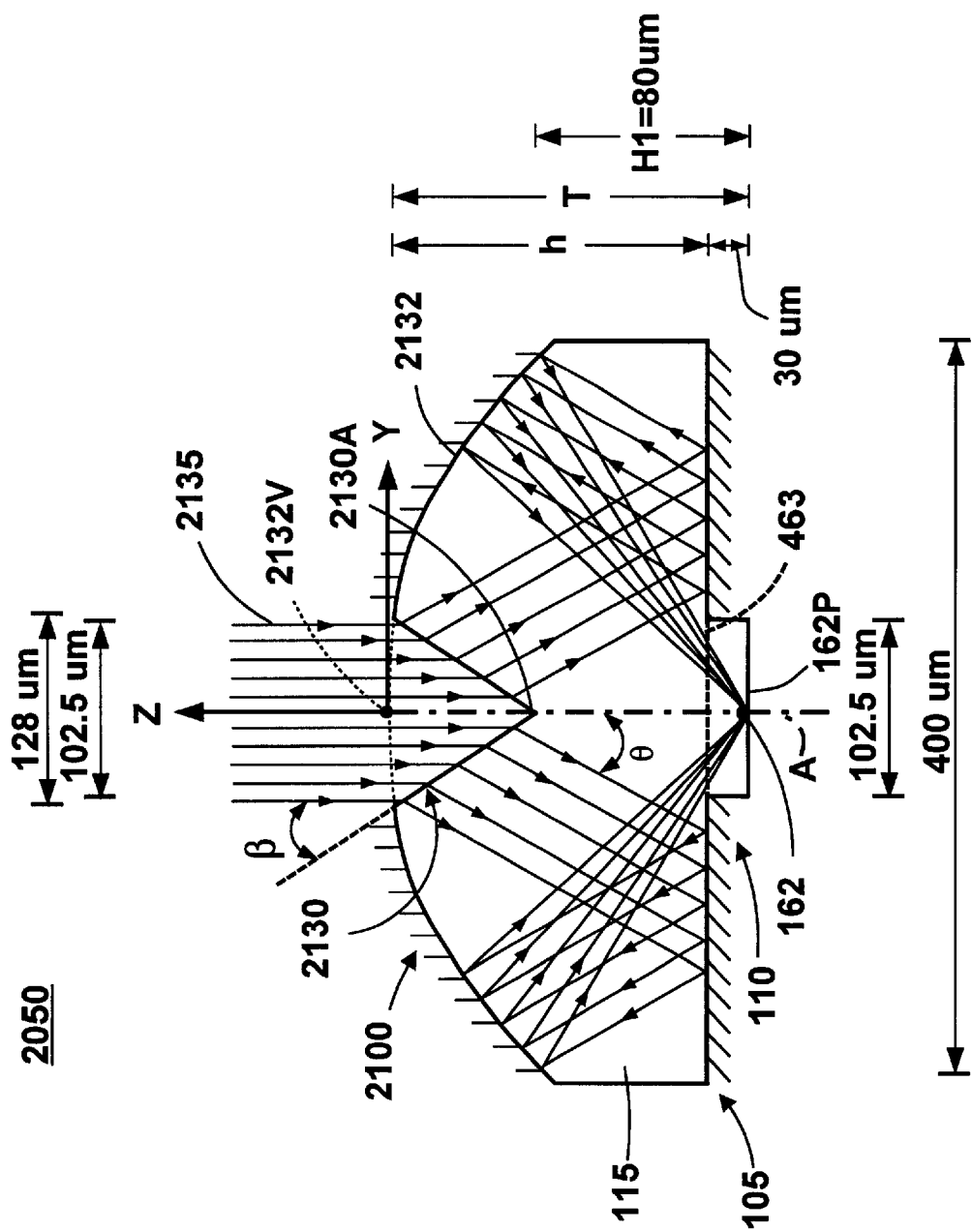
FIG. 30 is an enlarged, side elevational view of yet another optical focusing device forming part of the read/write head of FIGS. 1 and 2, and illustrating a conically shaped incident facet (or surface) for use with a collimated, convergent, or divergent incident beam (the collimated beam is shown as an exemplary embodiment)

FIG. 30 illustrates an optical focusing device 2050 that is generally similar in function to the other optical focusing devices described herein, and includes an incident surface 2100, a bottom reflective surface 105, a pedestal 110, and a body 115. The components of the optical focusing devices 50 and 2050 having similar function or design are referenced by similar numerals or numerals incremented by 2000.

The incident surface 2100 is generally similar in function to the previously described incident surface 100, and is comprised of a conically shaped central facet 2130 and a peripheral reflector 2132. The peripheral reflector 2132 can have a similar design to that of the peripheral reflector 132. In one embodiment, the peripheral reflector 2132 has a curved shape, and can assume a generally aspherical, parabolic, exponential, hyperbolic, or any other suitable shape that optically complements the shape of the central facet 2130 (as it will be explained later), and that focuses the light beam 2135 at the focal point 162. The optical focusing device 2050 is characterized by a relatively high efficiency, high degree of manufacturing tolerance, high numerical aperture, and minimal aberration.

In a writing mode, the incident optical beam 135 impinges upon the central facet 2130, and is almost entirely diffracted thereby. The conical shape of the central facet 2130 spreads the incident laser beam 2135 away from the pedestal 110 so that the number of central rays that pass through without being diffracted is minimized, thus optimizing the focused energy from the laser beam 2135 and improving the efficiency and performance of the optical focusing device 2050. In one design, the central facet 2130 has a conic constant ranging between approximately −1 and approximately −2, or a conic angle ranging between approximately 20 degrees and 30 degrees.

In the exemplary embodiment illustrated in FIG. 30, the incident laser beam 2135 is collimated, and passes through the transparent body 115, after being refracted by the central facet 2130, for impinging upon the bottom reflective surface 105. The laser beam 2135 is then reflected, also as a collimated beam, by the bottom reflective surface 105, through the body 115, onto the peripheral reflector 2132. The laser beam 2135 is then either reflected, refracted, diffracted, reflected and refracted, or reflected and diffracted by the peripheral reflector 2132 through the body 115, and is further focused to the focal point 162 located within the pedestal 110 at, or in close proximity to the focal plane 162P of the pedestal 110. In a preferred embodiment, the focal point 162 is located at the central axis A, co-linearly with the apex 2130A of the conically shaped central facet 2130, and the virtual vertex 2132V (shown in dashed line) of the peripheral reflector 2132.

Since the laser beam 2135 remains collimated after it is reflected by the bottom reflective surface 105, the manufacturing tolerance of the height "h" of the optical focusing device 2050 becomes less critical, as the footprint of the laser beam 2135 on the peripheral reflector 2132 remains unchanged. Furthermore, the laser beam 2135 is focused by the peripheral reflector 2132 to give diffraction-limited performance (or focused) spot. An advantage of the optical focusing device 2050 is the ability of the peripheral reflector 2132 to compensate for, and to eliminate undesirable aberrations introduced by the central facet 2130.

Even though the incident optical beam 2135 is illustrated as being collimated, it should be understood that the beam 2135 can alternatively be convergent or divergent. However, a change in the angle of incidence of the laser beam 2135 could necessitate a change in the curvature of the peripheral reflector 2132, to compensate for the aberrations introduced by the central facet 2130.

The optical focusing device 2050 provides a relatively high numerical aperture (NA) that can be controlled, as desired, by changing the conic constant of the central facet 2130, and the curvature of the peripheral reflector 2132. According to an exemplary design, the peripheral reflective facet 2132 is substantially aspherically shaped, the function of which can be approximated by the following equation:

$$Z = \frac{CV \cdot r^2}{1 + \sqrt{1 - CV^2(CC+1)r^2}} + a_4 r^4 + a_6 r^6 + a_8 r^8 + a_{10} r^{10},$$

where Z is the function of the aspherical surface; CV is the curvature of the surface, such that (CV=1/r), where r is the radius of the curvature and is defined as follows: $r=(x^2+y^2)^{1/2}$, where x and y represent the coordinates system; CC is the conic constant of the optical focusing device 2050; and $a_4$, $a_6$, $a_8$, and $a_{10}$ are the selected parameters.

Though exemplary dimensions of the optical focusing device 2050 are shown in FIG. 30, it should be clear that these dimensions can be changed, or scaled as desired for the intended applications. Upon scaling the dimensions of the optical focusing device 2050, the above coefficients are varied accordingly, to preserve the functionality of the optical focusing device 2050.

The following are exemplary characteristics and dimensions of the optical focusing device 2050:

The input aperture of the conical central facet 2130 is approximately 128 microns (um) in diameter, for receiving optical beam 2135 with a diameter of approximately 102.5 um.

The height "h" of the optical focusing device 2050, that is the distance between the virtual vertex 2132V and the bottom reflective surface 105, is approximately 187.5 um.

The overall height (T) of the optical focusing device 2050, that is the distance between the virtual vertex 2132V and the focal plane 162P containing the focal spot 162, is approximately 217.5 um.

The distance (H1) between the apex 2130A of the conically shaped central facet 2130 and the focal point 162 is approximately 80 um.

The height of the pedestal 110 is approximately 30 um.

The diameter of the pedestal 110 is approximately the same as that of the optical beam 2135, that is 102.5.

The diameter of the bottom reflective surface 105 is approximately 400 um.

NA is approximately 1.587.

Strehl ratio is approximately 0.997.

The root means square (RMS) optical path difference (OPD) is approximately 0.008λ, where λ is the wavelength of the laser beam 2135 and is equal to 650 nm (in this example).

The diffraction-limited diameter of the focal spot 162 is approximately 0.257 um.

The conic constant is approximately −1.5.

The spot diameter at power level of $(1/e^2)$ is approximately 0.50 micron.

The spot diameter at full wave at half maximum (FWHM) is approximately 0.23 micron.

The geometric diameter of the focal spot 162 is approximately 0.142 um.

r is approximately 181.90 um.

CC is approximately −1.388485.

$a_4$ is approximately 0.981891.

$a_6$ is approximately −178.515087.

$a_8$ is approximately 6.8108 E+03.

$a_{10}$ is approximately −6.0549 E+04.

According to another embodiment, the curvature of the peripheral reflector 2132 is defined by a tilted parabola that is expressed by the following equation:

$$Z = -ctg\ \theta \cdot r + \frac{2f \cdot \cos\theta}{\sin^2\theta} - \frac{2f}{\sin^2\theta}\sqrt{1 - \frac{\sin\theta}{f} \cdot r},$$

where θ is the rotation angle of the parabola curve; f is the focus length of the parabola; and r is the radius along the coordinate axis Z.

According to one example with the above curvature, the optical focusing device 2050 has a NA=1.587; a Strehl ratio=0.997; a diffractive limit=0.5 micron; a conic constant of −1.5; a spot diameter at power level of $(1/e^2)$=0.50 micron; a spot diameter at full wave at half maximum (FWHM)=0.23 micron; and a root means square (RMS) optical path difference (OPD)=0.00854λ, where λ is the wavelength of the laser beam 2135 and equals 650 nm.

Preferably, the body 115 is made of a glass material having an index of refraction (n) of about 1.8, that is available from Schott and designated by part number SF57 glass. The central facet 2130 can be coated with anti-reflective (AR) coating.

The design of the optical focusing device 2050 enables the control of the pedestal 110 by optimizing the shape of the peripheral reflector 2132. In a preferred embodiment, the height of the pedestal 110 is reduced so that the overall height (T) of the optical focusing device 2050 is minimized.

Figure 30A:
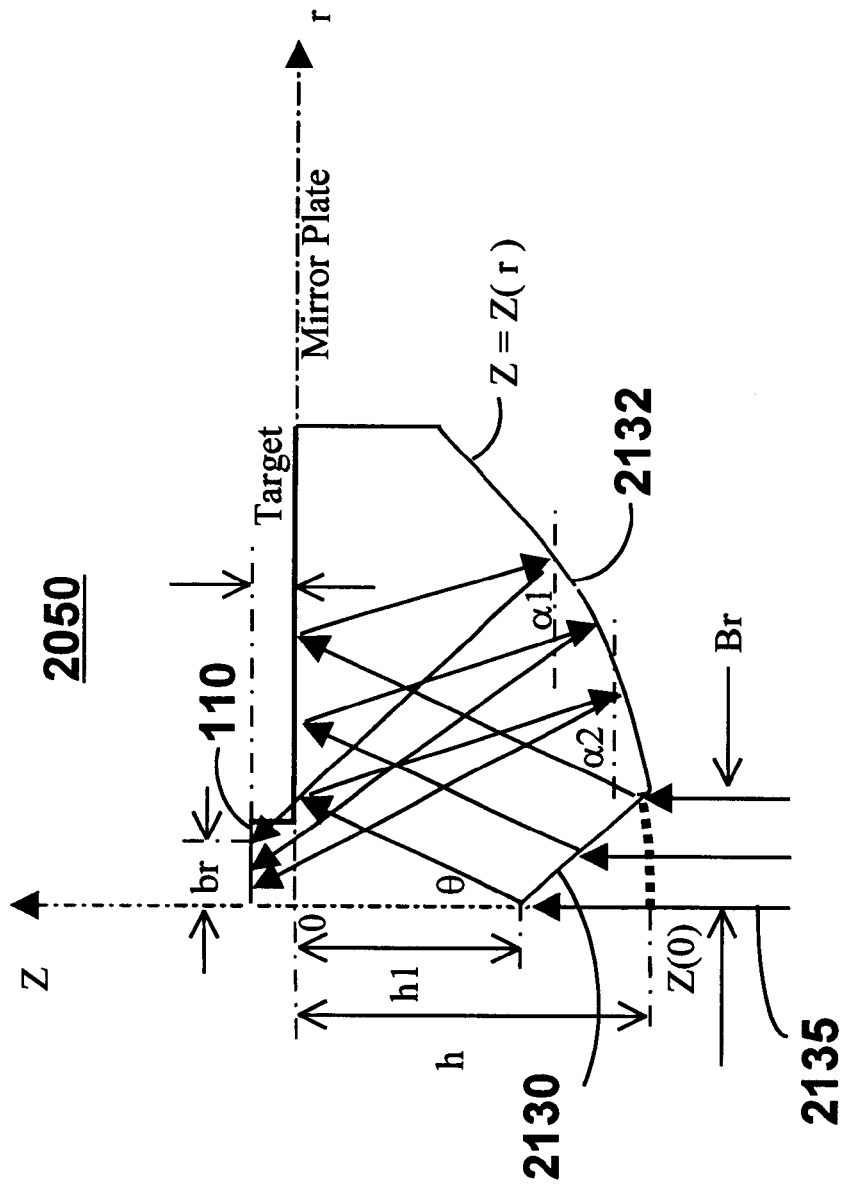
FIG. 30A is a modeling representation of an optical focusing device wherein the peripheral facet is represented by a titled parabola.

According to the embodiment illustrated in FIG. 30A, the peripheral reflector 2132 is a shifted (or rotated) parabola function, and is represented by the following equation:

$$Z = \text{Target} - \text{cotangent}(\theta)\gamma + \frac{2f\cos\theta}{\sin\theta^2} - \frac{2f}{\sin\theta^2}\sqrt{1 - \frac{\sin\theta}{f}\gamma},$$

where "Target" is the distance between a focus plane 162P containing the focal spot 162 and the bottom reflective surface 105; "θ" is the beam angle between the central A-axis and the rays refracted by the central facet 2130; and "f" is a function defined by the following equation:

$$f = \frac{(\text{Target} + h)\sin(\theta)^2}{2(1 - \cos(\theta))},$$

where "h" is the height of the optical focusing device as defined above.

The important dimensions of the optical focusing device 2050 to be defined by the designer for resolving the foregoing tenth order polynomial equation are as follows:

The height "h";

the beam angle "θ";

the focus distance/"Target"; and the radius of the incident beam 2135.

In an exemplary embodiment, the curvature of the peripheral reflector 2132 is defined by the following tenth order polynomial equation:

$$Z(r) = -h + \sum_{i=1}^{n} a_i r^i$$

where Z is the function defining the curvature of the peripheral reflector 2132; $r_i$ is the radius of curvature of the peripheral reflector 2132; h is the thickness of the optical focusing device; and n can be set to 10 (or a larger value) though a different number of terms can alternatively be selected. This curvature enables a precise control of the spot size, and further enables the selection of the term or terms that compensate for, and minimize the aberrations introduced by the central facet 2130 (i.e., diffraction-limited performance).

The focusing of the optical rays can be optimized using sequential quadratic program and a set of optimized coefficients $(a_i)$ are shown in the table below, with the optical focusing device 2050 having the following parameters:

h=1.5 mm.

Pedestal thickness=0.14 mm.

The angle of the rays refracted by the central facet 2130: θ=33.7°.

The depth of the central facet 2130: h1=0.6 mm.

These parameters provide a quick start point for further optimization using optical design software such as OSLO™.

TABLE

| Coefficients $(a_i)$ | | | | | |
|---|---|---|---|---|---|
| $a_0$ | $a_1$ | $a_2$ | $a_3$ | $a_4$ | $a_5$ |
| −1.500000E+00 | 3.028703E−01 | 1.664223E−01 | 3.073437E−02 | 7.094915E−03 | 1.834375E−03 |
| $a_6$ | $a_7$ | $a_8$ | $a_9$ | $a_{10}$ | |
| 5.081502E−04 | 1.474686E−04 | 4.425534E−05 | 1.362157E−05 | 4.276505E−06 | |

The above tenth order polynomial equation can be solved easily by approximating the perfect parabola surface. A significant advantage offered by this approach is the possibility of using a polynomial equation for a perfect parabola, for any desired order, by approximating the perfect parabola equation.

Once the foregoing tenth order polynomial equation is defined, it is possible to optimize the surface function of the peripheral reflector 2132 by performing an iterative process. In one embodiment, the iterative process includes only six iterations using the following equation starting with the polynomial coefficients derived previously or available from other sources.

Using a Sequential Quadratic Program (SQP) based at least in part on Powell, M. J. D. "A Fast Algorithm for Nonlinear Constrained Optimization Calculations", Lecture Notes in Mathematics 630, (Springer Verlag, Berlin 1978), pp 144–157; and Yugang Wang and Eric Sandgren, "A Power Code Employing The Sequential Quadratic Programming Method For Nonlinear Programming Problems", Technical Report 87DPC001, September 1986, ME, UMC., that are incorporated herein by reference, it is possible to optimize the foregoing equation. SQP uses second order approximations instead of linear approximations for solving nonlinear problems with supper convergence capability. While SPQ has been selected herein for describing a specific implementation of the present invention, it should be understood that other optimization methods can alternatively be used.

In general, the nonlinear constrained optimization problem is represented by the equations below:

Minimize $f(x)$ $x \ni R^n$

Subject to $h_i(x)=0$ $i=1, \ldots, NE$ $g_j(x) \geq 0$ $j=1, \ldots, NI$ $a_l \leq x_l \leq b_l$ $l=1, \ldots, N$ where x is a vector with N components, f(x) is the objective function, In general, the nonlinear constrained optimization problem is represented by the equations below:

h(x) are equal constrained functions, g(x) are unequal constrained functions, and a and b are the low and upper bounds for the available design.

The polynomial coefficients $a_1$, $a_2$ through $a_N$ in the foregoing equation are selected from the tenth order polynomial equation described previously, and iterations are carried out to optimize the objective function f(x). In this example, the objective function f(x) is the minimization of the focal spot (162) size. To this end, the objective function f(x) is selected as the square sum of the spot size of three rays of the optical beam 2135, as follows:

$f(x)=(br1)^2+(br2)^2+(br3)^2$, where "br" is the focal spot (162) radius (FIG. 30A), x is the design available and is a vector with n components $x_i$, each component $x_i$ represents a coefficient $a_i$, such that $x_i=a_i$ for $i=1, \ldots, n$. In this example, no constraint is placed on the low and upper bounds (a) and (b).

The following tables exemplify the initial polynomial coefficients $a_i$, and the optimal polynomial coefficients $a_i$ obtained after six iterations.

| Initial Polynomial Coefficients | | | | | |
|---|---|---|---|---|---|
| $a_0$ | $a_1$ | $a_2$ | $a_3$ | $a_4$ | $a_5$ |
| −1.500000E+00 | 3.028703E−01 | 1.664223E−01 | 3.073437E−02 | 7.094915E−03 | 1.834375E−03 |
| $a_6$ | $a_7$ | $a_8$ | $a_9$ | $a_{10}$ | Focal spot size |
| 5.081502E−04 | 1.474686E−04 | 4.425534E−05 | 1.362157E−05 | 4.276505E−06 | 1.09E−2 mm |

| Optimal Polynomial Coefficients | | | | | |
|---|---|---|---|---|---|
| $a_0$ | $a_1$ | $a_2$ | $a_3$ | $a_4$ | $a_5$ |
| −1.500000E+00 | 3.028695E−01 | 1.664258E−01 | 3.073970E−02 | 7.100797E−03 | 1.838372E−03 |
| $a_6$ | $a_7$ | $a_8$ | $a_9$ | $a_{10}$ | Focal spot size |
| 5.082630E−04 | 1.425336E−04 | 3.580936E−05 | 7.708509E−06 | 1.617265E−05 | 1.92E−9 mm |

Figure 38:
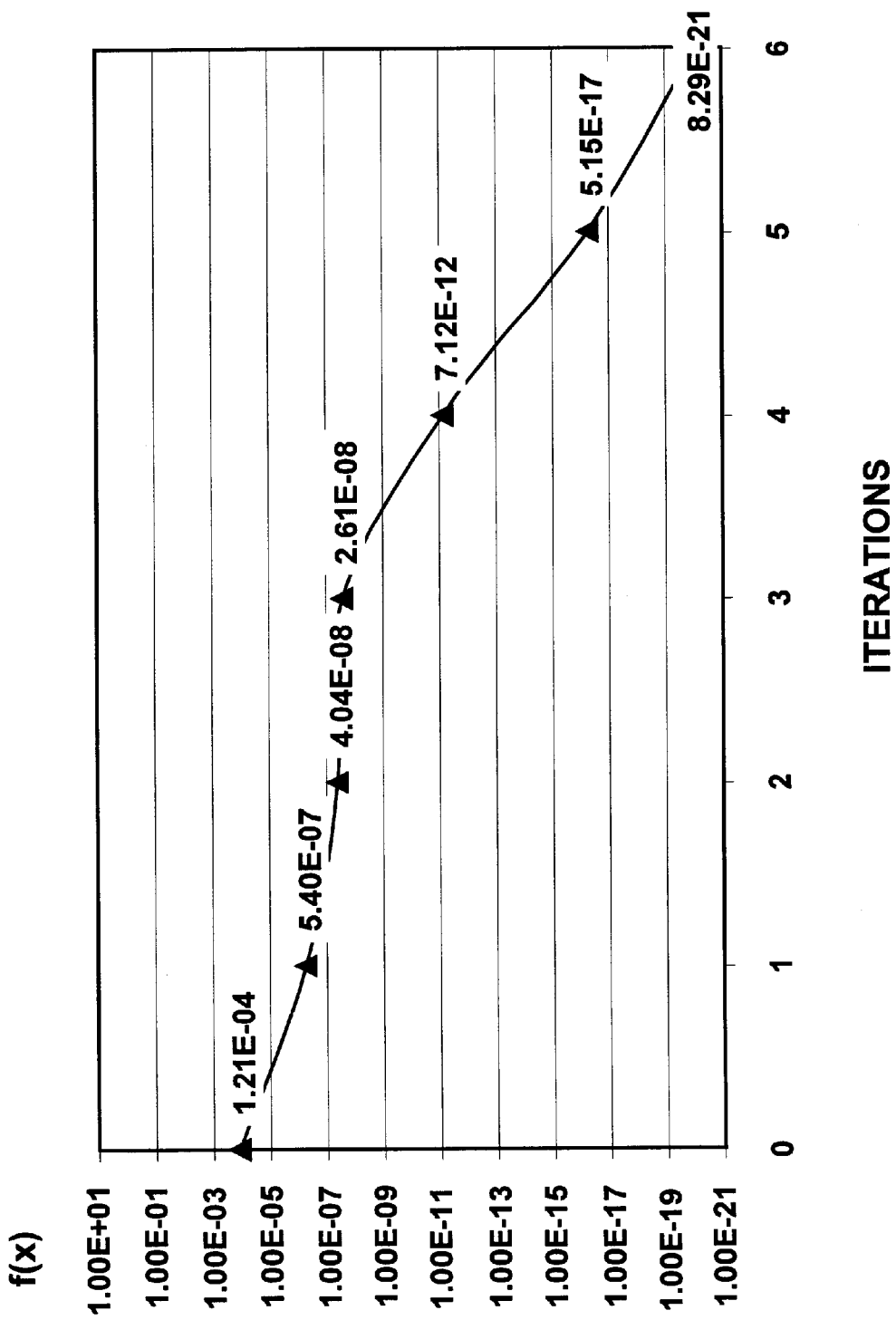
FIG. 38 illustrates an exemplary iterative process for optimizing the trace function of the peripheral reflector of FIG. 30.

These two tables clearly illustrate that, using the foregoing analysis and SQP, the size of the focal point 162 can be decreased significantly. FIG. 38 illustrates the exemplary 6-iteration process for optimizing the trace function of the peripheral reflector 2132.

According to another embodiment, the curvature of the peripheral reflector 2132 is an optimized aspherical function defined by the following even polynomial equation:

$$Z(y) = -h + \frac{y^2}{R\left(1 + \sqrt{1 - (k+1)\frac{y^2}{R^2}}\right)} + a_4 y^4 + a_6 y^6 + a_8 y^8 + a_{10} y^{10} + \ldots,$$

where "R" is the radius of the aspherical surface of the peripheral reflector 2132, and "k" is the conic constant of the body 115.

The important dimensions of the optical focusing device 2050 to be defined by the designer for resolving the foregoing aspherical polynomial equation are as follows:

The height "h";

the conic constant k, where: k=1/tangent β, with β being the conic angle of the central facet 2130, that is the angle between the central facet 2130 and the Z-axis (FIG. 30A), which is also referred to herein as the central A-axis;

the index of the body optical material;

the radius of the incident beam 2135; and the "Target", as defined previously.

By using the Sequential Quadratic Program (SQP) described above, or any other suitable optimization technique, the nonlinear constrained optimization problem is represented by the equations below:

Minimize $f(x)$     $x \ni R''$

Subject to $h_i(x) = 0$    $i = 1, \ldots, NE$ $g_j(x) \geq 0$    $j = 1, \ldots, NI$ $a_l \leq x_l \leq b_l$    $l = 1, \ldots, N$ where x is a vector with N components, referred to as design variable.

f(x) is referred to as objective function.

h(x) is referred to equal constrained functions.

g(x) is referred to unequal constrained functions, a and b are the low and upper bounds for the available design.

The polynomial coefficients $a_2$, $a_4$, $a_6$, $a_8$, and $a_{10}$ are even polynomial orders. In this example, the objective function f(x) is the minimization of the focal spot (162) size. To this end, the objective function f(x) is selected as the square sum of the spot size of three rays of the optical beam 2135, as follows:

$$f(x)=(br1)^2+(br2)^2+(br3)^2,$$

where "br" is the focal spot (162) radius, $x_i$ is the design available and is a vector with N components, where N=5, $x_1=R$, $x_2=a_4$, $x_3=a_6$, $x_4=a_8$, $x_5=a_{10}$. In this example, no constraint is placed on the low and upper bounds (a) and (b).

The following tables exemplify the initial polynomial coefficients $a_i$, and the optimal polynomial coefficients $a_i$ obtained after thirteen iterations.

| Initial Polynomial Coefficients | | |
|---|---|---|
| $x_1$ | $x_2$ | $x_3$ |
| 1.81902000E−01 | 9.81891000E−01 | −1.7851 5087E+02 |
| $x_4$ | $x_5$ | Focal Spot Radius |
| 6.81080000E+03 | −6.05490000E+04 | 0.0101 mm |
| Optimal Polynomial Coefficients | | |
| $x_1$ | $x_2$ | $x_3$ |
| 1.85780652E−01 | 4.26490708E−01 | −1.78555493E+02 |
| $x_4$ | $x_5$ | Focal Spot Radius |
| 6.81079660E+03 | −6.05490000E+04 | 0.0002 mm |

These two tables clearly illustrate that, using the foregoing analysis and SQP, the size of the focal point 162 can be decreased significantly.

Figure 31:
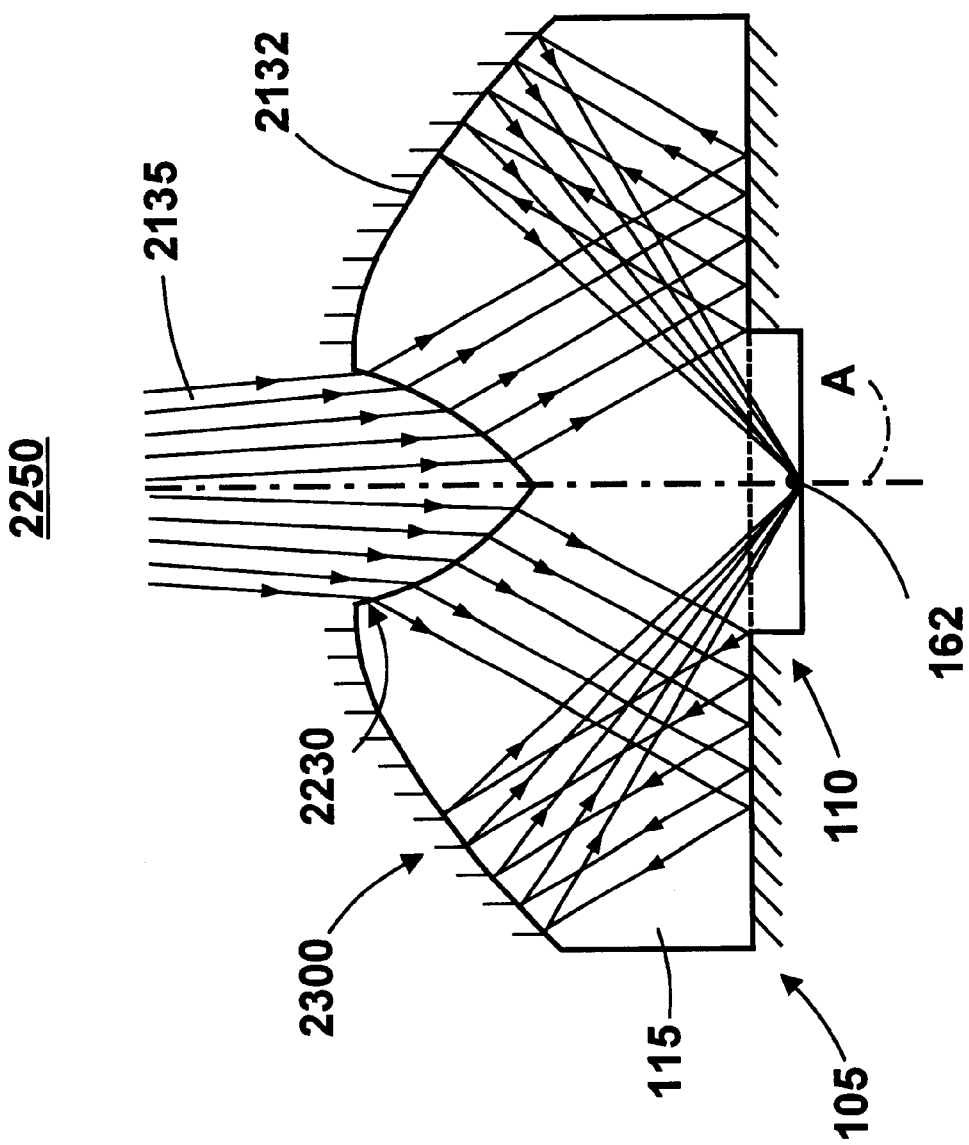
FIG. 31 is an enlarged, side elevational view of another optical focusing device forming part of the read/write head of FIGS. 1 and 2, illustrating a lensed incident facet for use with a collimated, convergent, or divergent incident beam (the divergent beam is shown as an exemplary embodiment)

FIG. 31 illustrates an optical focusing device 2250 that is generally similar in function to the optical focusing device 2050 (FIG. 30), and that includes an incident surface 2300, a bottom reflective surface 105, a pedestal 110, and a body 115. The incident surface 2300 is generally similar to the incident surface 2130 (FIG. 30), and includes a central facet 2230 that is lensed, for example with a concave shape, to further complement the peripheral reflector 2132 by relieving the focusing stress of the central facet 2230, thereby increasing the flexibility of the focal spot adjustment.

Figure 32:
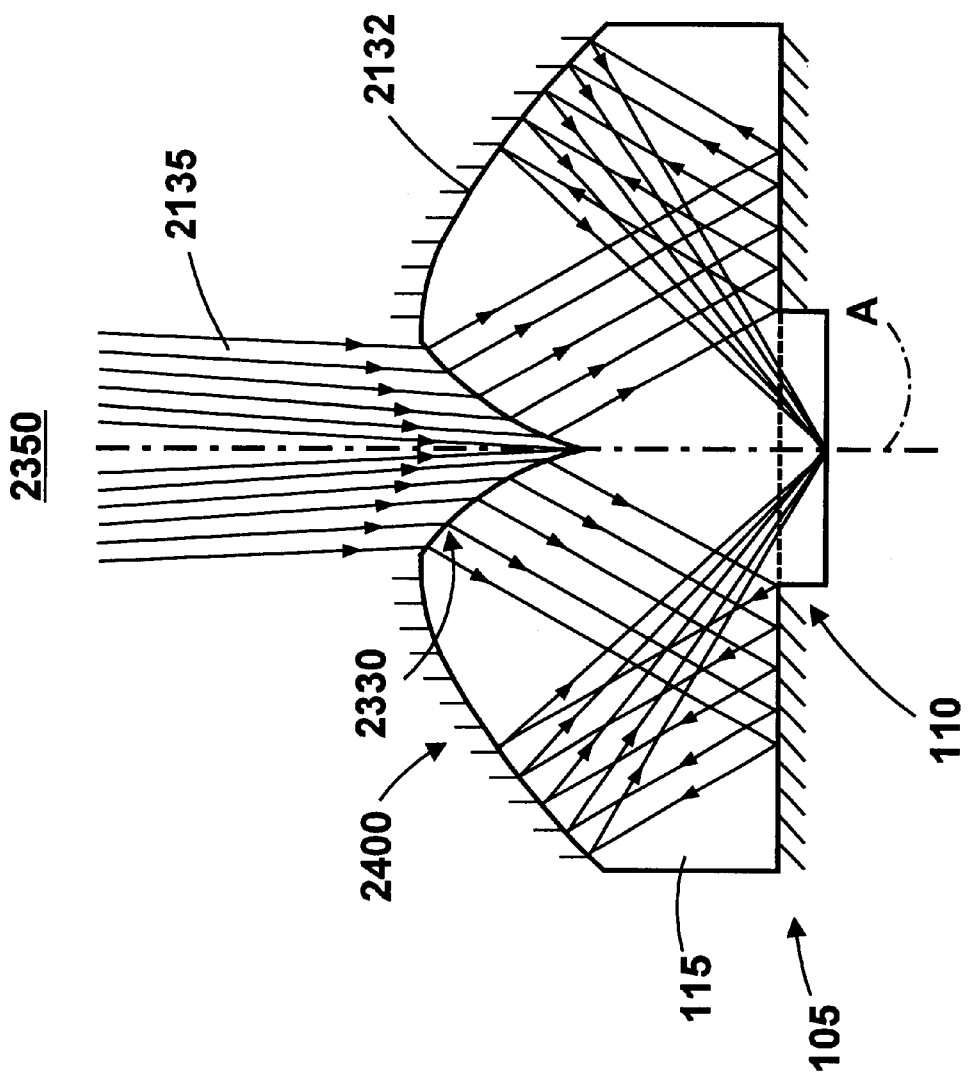
FIG. 32 is an enlarged, side elevational view of another optical focusing device forming part of the read/write head of FIGS. 1 and 2, illustrating a lensed incident facet for use with a collimated, convergent, or divergent incident beam (the convergent beam is shown as an exemplary embodiment)

FIG. 32 illustrates an optical focusing device 2350 that is generally similar in function to the optical focusing device 2250 (FIG. 31), and that includes an incident surface 2400, a bottom reflective surface 105, a pedestal 110, and a body 115. The incident surface 2400 is generally similar to the incident surface 2300 (FIG. 31), and includes a central facet 2330 that is lensed, for example with a convex shape, to further complement the peripheral reflector 2132 by relieving by relieving the focusing stress of the central facet 2330, thereby increasing the flexibility of the focal spot adjustment.

Figure 33:
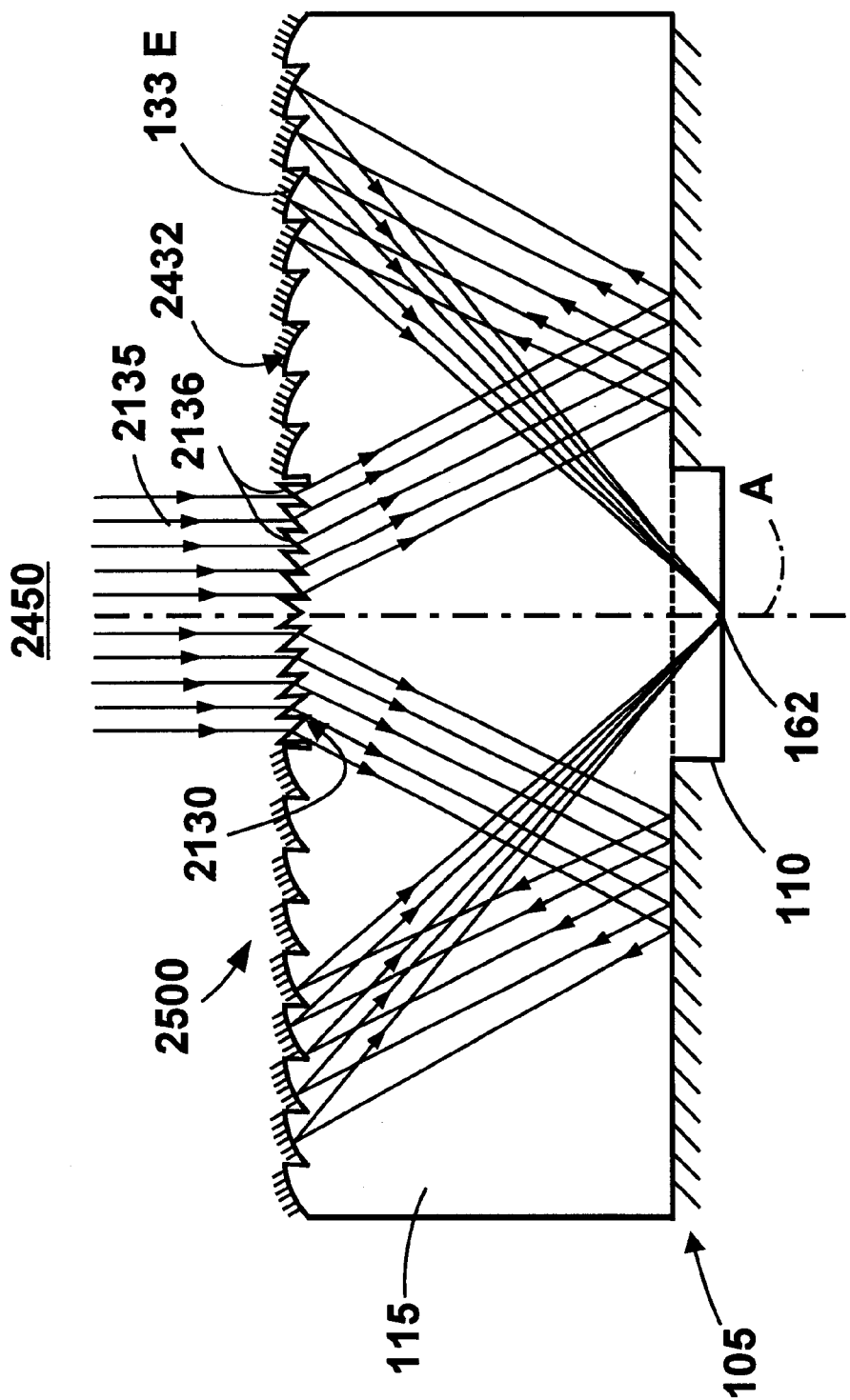
FIGS. 33 and 34 are enlarged, side elevational views of other optical focusing devices forming part of the read/write head of FIGS. 1 and 2, and illustrating a conically shaped incident facet for use with a collimated, convergent, or divergent incident beam (the collimated beam is shown as an exemplary embodiment), and a generally flat peripheral reflector that can be made, for example, as a diffractive optical element or a Fresnel lens.

FIG. 33 illustrates an optical focusing device 2450 that is generally similar in function to the optical focusing devices previously described, for example 50 (FIG. 23) and 2050 (FIG. 30), and that includes an incident surface 2500, a bottom reflective surface 105, a pedestal 110, and a body 115. The incident surface 2500 includes a central facet 2130 that can be conically shaped similar to the central facet 2130 (FIG. 30), or lensed similar to the central facets 2230 (FIG. 31) or 2330 (FIG. 32). The incident surface 2500 includes a peripheral reflector 2432 that is generally flat and that includes a pattern of reflective, diffractive, or refractive gratings 133E, as described herein, for example in connection with the embodiments of FIGS. 23 through 29. In specific embodiments, the peripheral reflector 2432 is generally flat and that can be made of a diffractive optical element or a Fresnel lens. The central facet 2130 can include a series of refractive conical steps 2136 or stepped lenses (concave or convex).

Figure 34:
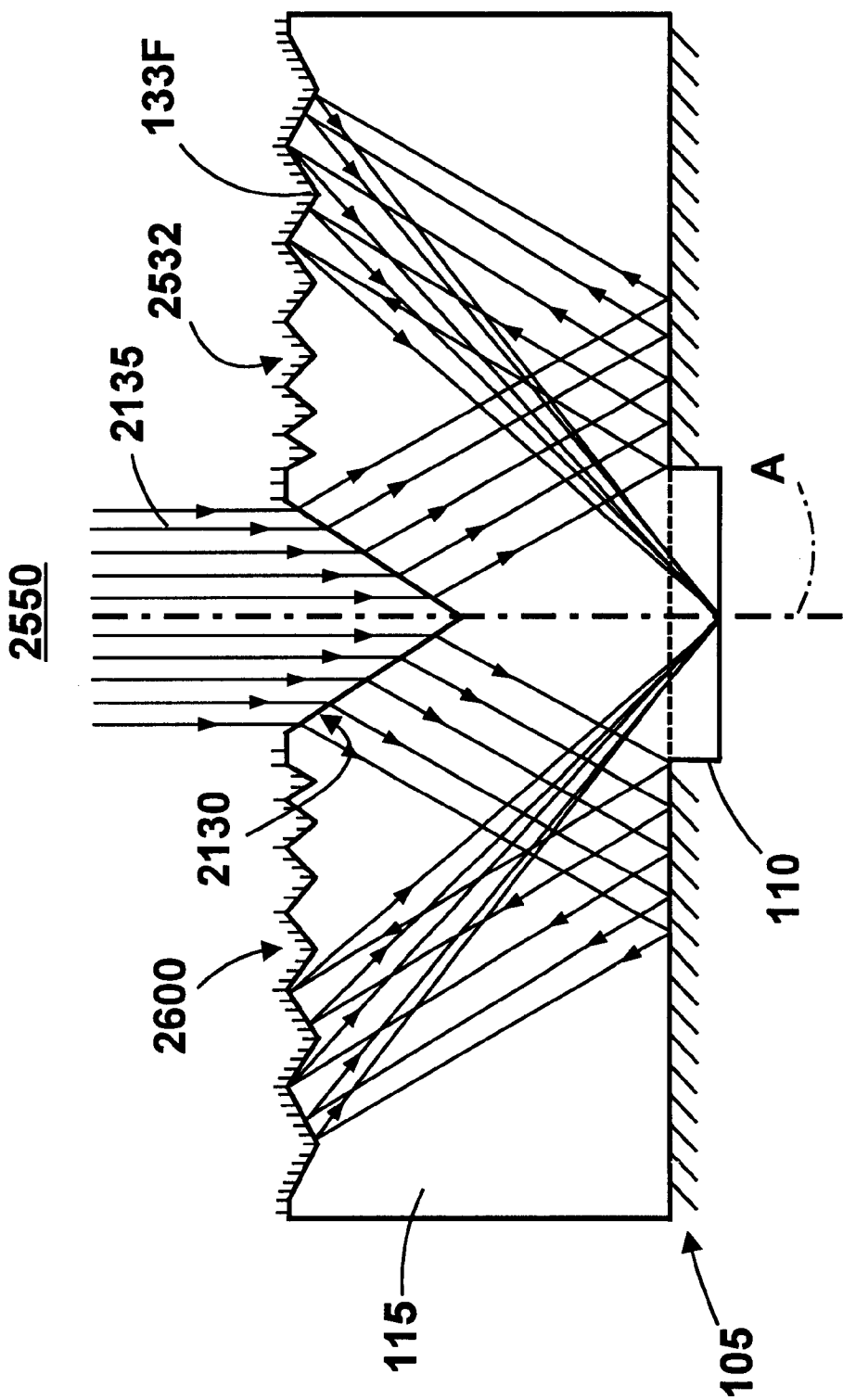

FIG. 34 illustrates an optical focusing device 2550 that is generally similar in function to the optical focusing device 2450 (FIG. 33), and that includes an incident surface 2600, a bottom reflective surface 105, a pedestal 110, and a body 115. The incident surface 2600 includes a central facet that can be conically shaped similar to the central facet 2130 (FIG. 30), or lensed similar to the central facets 2230 (FIG. 31) or 2330 (FIG. 32). The incident surface 2600 further a peripheral reflector 2532 that is generally flat and that includes a pattern of reflective, diffractive, or refractive gratings 133F, as described herein, for example in connection with the embodiments of FIGS. 23 through 29. The optical focusing device 2550 shows a pattern of generic gratings 133F with a non-periodic (i.e., variable) distribution of gratings along the peripheral is surface 2600.

FIG. 35 represents a generic illustration of an optical focusing device 3550 that is generally similar in function to the optical focusing device 2550 (FIG. 34). The optical focusing device 3550 includes a generally flat incident surface 3600, a bottom reflective surface 105, a pedestal 110, and a body 115. The incident surface 3600 includes a generally flat central facet 3130 and a generally flat peripheral reflector 3532 as described herein in relation with other embodiments.

With further reference to FIG. 36, the peripheral reflector 3532 is formed of a pattern of stepped, diffractive micro-structures or micro-gratings 4000. The micro-structures 4000 are coated with a reflective layer 3610. For illustration purpose only, each micro-grating 4000 is approximately 0.65 micron wide and approximately 0.45 micron high. The micro-structures 4000 can be identical and periodic, or, alternatively, they can have different, aperiodic shapes.

With further reference to FIG. 37, the central facet 3130 is formed of a pattern of stepped, diffractive micro-structures or micro-gratings 4100. These micro-structures 4100 diffract the light beam away from the pedestal 110. For illustration purpose only, each micro-grating 4100 is approximately 0.26 micron wide and approximately 0.45 micron high. The micro-structures 4100 can be identical and periodic, or, alternatively, they can have different, aperiodic shapes.

As an example, the phase distribution function Φ(r) of the central facet 2530 is defined by the following equation:

$$\Phi(r) = -\frac{2\pi}{\lambda}r$$

The phase distribution function Φ(r) of the peripheral reflector 2532 is defined by the following equation:

$$\Phi(r) = \frac{2\pi}{\lambda}(a_1 \cdot r + a_2 \cdot r^2 + a_3 \cdot r^3 + a_4 \cdot r^4),$$

where $r = |\sqrt{x^2 + y^2}|$.

and $a_1$ is approximately 0.848330; $a_2$ is approximately 7.440246; $a_3$ is approximately −15.700477; and $a_4$ is approximately 14.359795.

The dimensions of an exemplary optical focusing device 3550 shown in FIG. 13 are as follows:

The diameter of the central facet 3130 is approximately 123 um.

The height of the body 115, that is the distance between the incident surface 3600 and the bottom reflective surface 105 is approximately 130 um.

The overall height of the optical focusing device 3550, that is the distance between the incident surface 3600 and the focal plane containing the focal spot 162, is approximately 170 um.

The height of the pedestal 110 is approximately 40 um.

The diameter of the pedestal 110 is approximately 123 um.

The diameter of the bottom reflective surface 105 is approximately 450 um.

NA is approximately 1.448.

Strehl ratio is approximately 1.

The diffraction-limited radius of the focal spot is approximately 0.273 um.

The spot size diameter at full wave at half maximum (FWHM) is approximately 0.25 micron.

The geometric spot size radius of the focal spot 162 is approximately 0.01 um.

In another alternative embodiment according to the present invention, the central facet, for example 130 (FIGS. 23, 24, 27–29), 2130 (FIGS. 30, 33, 34), 2230 (FIG. 31), 2330 (FIG. 32), or 3130 (FIG. 35) can be provided with a holographic optical element.

It should be understood that the geometry, compositions, and dimensions of the elements described herein may be modified within the scope of the invention and are not intended to be the exclusive; rather, they can be modified within the scope of the invention. Other modifications may be made when implementing the invention for a particular environment. For example, refractive or diffractive gratings can be added to the bottom reflective surface, as explained herein in connection with the incident surface. The use of the optical focusing device is not limited to data storage devices, as it can be used in various other optical applications, including but not limited to high resolution microscopy, surface inspection, and medical imaging.

What is claimed is:

1. An optical focusing device in an optical recording device for focusing an incident optical beam to a focal spot on an optical recording medium, comprising:

an incident surface comprised of a peripheral reflector and a central facet upon which the optical beam impinges;

a body through which the incident optical beam passes;

a bottom reflective surface for reflecting the optical beam through said body toward said peripheral reflector;

a pedestal extending from said bottom reflective surface for defining a focal plane on which the focal spot is formed; and said peripheral reflector focusing the optical beam from the bottom reflective surface to the focal spot, and having a generally aspherical shape approximated by even polynomial parameters, wherein said central facet is generally flat and is diffractive and optically transmissive, and said peripheral reflector includes a diffractive phase profile.

2. An optical focusing device according to claim 1, wherein said aspherical shape of said peripheral reflector is defined by the following equation:

$$Z = \frac{CV \cdot r^2}{1 + \sqrt{1 - CV^2(CC+1)r^2}} + a_4 r^4 + a_6 r^6 + a_8 r^8 + a_{10} r^{10},$$

where Z is the function of the aspherical surface; CV is the curvature of the surface, such that (CV=1/r), where r is the radius of the curvature and is defined as follows: $r=(x^2+y^2)^{1/2}$, where x and y represent the coordinates system; CC is the conic constant of the optical focusing device; and $a_4$, $a_6$, $a_8$, and $a_{10}$ are polynomial parameters.

3. An optical focusing device according to claim 1, wherein said central facet is optically refractive.

4. An optical focusing device according to claim 1, wherein said phase profile includes a pattern of concentric binary refractive profiles that are coated with a reflective layer.

5. An optical focusing device according to claim 4, wherein said incident is formed of an incident plate that is separate from said body.

6. An optical focusing device according to claim 4, wherein at least some of said refractive profiles include tilted edges.

7. An optical focusing device according to claim 1, wherein the beam reflected by said bottom reflective surface impinges upon said peripheral reflector; and wherein said peripheral reflector is any of: reflective; reflective and refractive; or reflective and diffractive.

8. An optical focusing device according to claim 1, wherein said peripheral reflector includes a generally parabolic shape approximated by a tilted parabola.

9. An optical focusing device according to claim 8, wherein said peripheral reflector shape is expressed by the following equation:

$$Z = -ctg\,\theta \cdot r + \frac{2f \cdot \cos\theta}{\sin^2\theta} - \frac{2f}{\sin^2\theta}\sqrt{1 - \frac{\sin\theta}{f} \cdot r},$$

where θ is the rotation angle of the parabola curve; f is a focus length of the parabola; and r is the radius along a coordinate axis Z.

10. An optical focusing device according to claim 8, wherein said central facet is coated with an anti-reflective (AR) coating.

11. An optical focusing device according to claim 8, wherein said peripheral reflector shape is expressed by the following equation:

$$Z = \text{Target} - \text{cotangent }(\theta)\gamma + \frac{2f\cos\theta}{\sin\theta^2} - \frac{2f}{\sin\theta^2}\sqrt{1 - \frac{\sin\theta}{f}\gamma},$$

where "Target" is the distance between a focus plane containing the focal spot and said bottom reflective surface; "$\theta$" is a beam angle defined between a central A-axis and rays refracted by said central facet; and "f" is a function defined by the following equation:

$$f = \frac{(\text{Target} + h)\sin(\theta)^2}{2(1 - \cos(\theta))},$$

where "h" is the height of the optical focusing device defined as the distance between a virtual vertex of said central facet and said bottom reflective surface.

12. An optical focusing device according to claim 11, wherein said peripheral reflector is optimized for minimal focal spot size by means of an iterative process.

13. An optical focusing device according to claim 12, wherein said iterative process includes a plurality of iterations using pre-defined polynomial coefficients in the following equation:

$$Z(r) = -h + \sum_{i=1}^{n} a_i r^i$$

where Z is the function defining the curvature of said peripheral reflector 2132; $r_i$ is the radius of curvature of said peripheral reflector.

14. An optical focusing device according to claim 13, wherein said iterative process includes using a Sequential Quadratic Program (SQP).

15. An optical focusing device according to claim 1, wherein said peripheral reflector shape is approximated by the following equation:

$$Z(y) = -h + \frac{y^2}{R\left(1 + \sqrt{1 - (k+1)\frac{y^2}{R^2}}\right)} + a_4 y^4 + a_6 y^6 + a_8 y^8 + a_{10} y^{10} + \ldots,$$

where "R" is the radius of said aspherically shaped surface, and "k" is the conic constant of said body.

16. An optical focusing device according to claim 1, wherein said peripheral reflector has a shape that is approximated by the following equation:

$$Z = \frac{2\pi}{\lambda}(a_0 + a_1 \cdot r^2 + a_2 \cdot r^4 + a_3 \cdot r^6 + a_4 \cdot r^8 + a_5 \cdot r^{10} + \ldots + a_n \cdot r^{2n})$$

where r is the radius of the curvature and is defined as follows: $r=(x^2+y^2)^{1/2}$, where x and y represent the coordinates system, and $a_1$ through $a_n$ are polynomial coefficients.

17. An optical focusing device in an optical recording device for focusing an incident optical beam to a focal spot on an optical recording medium, comprising:
   an incident surface comprised of a peripheral reflector and a central facet upon which the optical beam impinges;
   a body through which the incident optical beam passes;
   a bottom reflective surface for reflecting the optical beam through said body toward said peripheral reflector;
   a pedestal extending from said bottom reflective surface for defining a focal plane on which the focal spot is formed; and
   said peripheral reflector includes a diffractive phase profile for focusing the optical beam from the bottom reflective surface to the focal spot, and having a generally aspherical shape approximated by even polynomial parameters,
   wherein said pedestal is generally cylindrically shaped.

18. An optical focusing device in an optical recording device for focusing an incident optical beam to a focal spot on an optical recording medium, comprising:
   an incident surface comprised of a peripheral reflector and a central facet upon which the optical beam impinges;
   a body through which the incident optical beam passes;
   a bottom reflective surface for reflecting the optical beam through said body toward said peripheral reflector;
   a pedestal extending from said bottom reflective surface for defining a focal plane on which the focal spot is formed; and
   said peripheral reflector includes a diffractive phase profile for focusing the optical beam from the bottom reflective surface to the focal spot, and having a generally aspherical shape approximated by even polynomial parameters,
   wherein said peripheral reflector compensates for aberrations introduced by said central facet.

19. An optical focusing device in an optical recording device for focusing an incident optical beam to a focal spot on an optical recording medium, comprising:
   an incident surface comprised of a peripheral reflector and a central facet upon which the optical beam impinges;
   a body through which the incident optical beam passes;
   a bottom reflective surface for reflecting the optical beam through said body toward said peripheral reflector;
   a pedestal extending from said bottom reflective surface for defining a focal plane on which the focal spot is formed; and
   said peripheral reflector focusing the optical beam from the bottom reflective surface to the focal spot, and having a generally aspherical shape approximated by even polynomial parameters,
   wherein said central facet is generally flat and is diffractive and optically transmissive, and said peripheral reflector includes a patterned grating profile.

20. An optical focusing device according to claim 19, wherein said central facet is optically refractive.

21. An optical focusing device according to claim 20, wherein said phase profile includes a pattern of concentric binary refractive profiles that are coated with a reflective layer.

22. An optical focusing device according to claim 21, wherein said surface is formed of an incident plate that is separate from said body.

23. An optical focusing device according to claim 21, wherein at least some of said refractive profiles include tilted edges.

24. An optical focusing device according to claim 19, wherein the beam reflected by said bottom reflective surface impinges upon said peripheral reflector; and
   wherein said peripheral reflector is any of: reflective; reflective and refractive; or reflective and diffractive.

25. An optical focusing device according to claim 19, wherein said peripheral reflector includes a generally parabolic shape approximated by a tilted parabola.

26. An optical focusing device in an optical recording device for focusing an incident optical beam to a focal spot on an optical recording medium, comprising:

an incident surface comprised of a peripheral reflector and a central facet upon which the optical beam impinges;

a body through which the incident optical beam passes;

a bottom reflective surface for reflecting the optical beam through said body toward said peripheral reflector;

a pedestal extending from said bottom reflective surface for defining a focal plane on which the focal spot is formed; and said peripheral reflector focusing the optical beam from the bottom reflective surface to the focal spot, and having a generally aspherical shape approximated by even polynomial parameters, wherein said central facet is generally flat and is diffractive and optically transmissive, and said peripheral reflector includes any of a diffractive grating or a Fresnel lens structure.

27. An optical focusing device in an optical recording device for focusing an incident optical beam to a focal spot on an optical recording medium, comprising:

an incident surface comprised of a peripheral reflector and a central facet upon which the optical beam impinges;

a body through which the incident optical beam passes;

a bottom reflective surface for reflecting the optical beam through said body toward said peripheral reflector;

a pedestal extending from said bottom reflective surface for defining a focal plane on which the focal spot is formed; and said peripheral reflector includes a diffractive phase profile for focusing the optical beam from the bottom reflective surface to the focal spot, and having a generally aspherical shape approximated by even polynomial parameters, wherein said pedestal is generally conically shaped.

* * * * *